United States Patent [19]

Otto

[11] Patent Number: 5,684,936
[45] Date of Patent: Nov. 4, 1997

[54] METHOD AND APPARATUS FOR GENERATING A RENDERING ORDER FOR USE IN RENDERING IMAGES USING A PRE-PROCESSING TECHNIQUE

[75] Inventor: Gerhardt Paul Otto, Guildford, England

[73] Assignee: Canon Kabushiki Kaisha, Tokyo, Japan

[21] Appl. No.: 712,752

[22] Filed: Sep. 12, 1996

Related U.S. Application Data

[63] Continuation of Ser. No. 196,495, Feb. 15, 1994, abandoned.

[30] Foreign Application Priority Data

Feb. 15, 1993 [GB] United Kingdom .................... 9303009
Jul. 1, 1993 [GB] United Kingdom .................... 9313617

[51] Int. Cl.$^6$ .................................................... G06T 15/40
[52] U.S. Cl. .................................................... 395/121
[58] Field of Search .................................... 395/121, 123, 395/134

[56] References Cited

U.S. PATENT DOCUMENTS 3,889,107  6/1975  Sutherland .................... 395/121 X
4,594,673  6/1986  Holly .................................. 395/121

FOREIGN PATENT DOCUMENTS 0300703  1/1989  European Pat. Off. .
2187615  9/1987  United Kingdom .
2201568  9/1988  United Kingdom .

OTHER PUBLICATIONS

Extract from Artificial Horizons Inc. "Aviator" Documentation.

Foley et al., "Computer Graphics Principles and Practice", Addison–Wesley Publishing Company, 1990, pp. 660–680.

Sutherland et al., "A Characterization of Ten Hidden–Surface Algorithms", Computing Surveys, vol. 6, No. 1, Mar. 1974, pp. 1–55.

DeBerg and Overmars, "Hidden Surface Removal For Axis––Parallel Polyhedra", Proceeding 31st Annual Symposium On Foundations of Computer Science, vol. 1, Oct. 22, 1990, pp. 252–261.

*Primary Examiner*—Mark K. Zimmerman
*Attorney, Agent, or Firm*—Fitzpatrick, Cella, Harper & Scinto

[57] ABSTRACT

Polygons defined in three-dimensional space are processed so as to determine a rendering order. Cycles are detected and broken by splitting a polygon into a plurality of smaller polygons. The procedure may be effected as a pre-process, for producing rendering order lists, trees or directed graphs.

52 Claims, 24 Drawing Sheets

$d_1 < d_2 \therefore v_1 = d_1$
$d_3 < d_4 \therefore v_2 = d_3$
$d_1 > d_3 \ (v_1 > v_2) \therefore $ SPLIT POLYGON $P_1$

FIG. 2

SHAPE FILE

| OBJECT | N(V) | N(P) | |
|---|---|---|---|
| $V_1$ | $x(V_1)$ | $y(V_1)$ | $z(V_1)$ |
| $V_2$ | $x(V_2)$ | $y(V_2)$ | $z(V_2)$ |
| $V_m$ | $x(V_m)$ | $y(V_m)$ | $z(V_m)$ |

| | | | | | |
|---|---|---|---|---|---|
| $P_1$ | $N(V)_1$ | $V_{a1}$ | $V_{b1}$ | | |
| $P_2$ | $N(V)_2$ | $V_{a2}$ | $V_{b2}$ | | |
| $P_q$ | $N(V)_q$ | $V_{aq}$ | $V_{bq}$ | | |

| $V_{n1}$ | $ka_1$ | $kd_1$ | $ks_1$ | COLOR $P_1$ |
|---|---|---|---|---|
| $V_{n2}$ | $ka_2$ | $kd_2$ | $ks_2$ | COLOR $P_2$ |
| $V_{nq}$ | $ka_q$ | $kd_q$ | $ks_q$ | COLOR $P_q$ |

COMMENTS

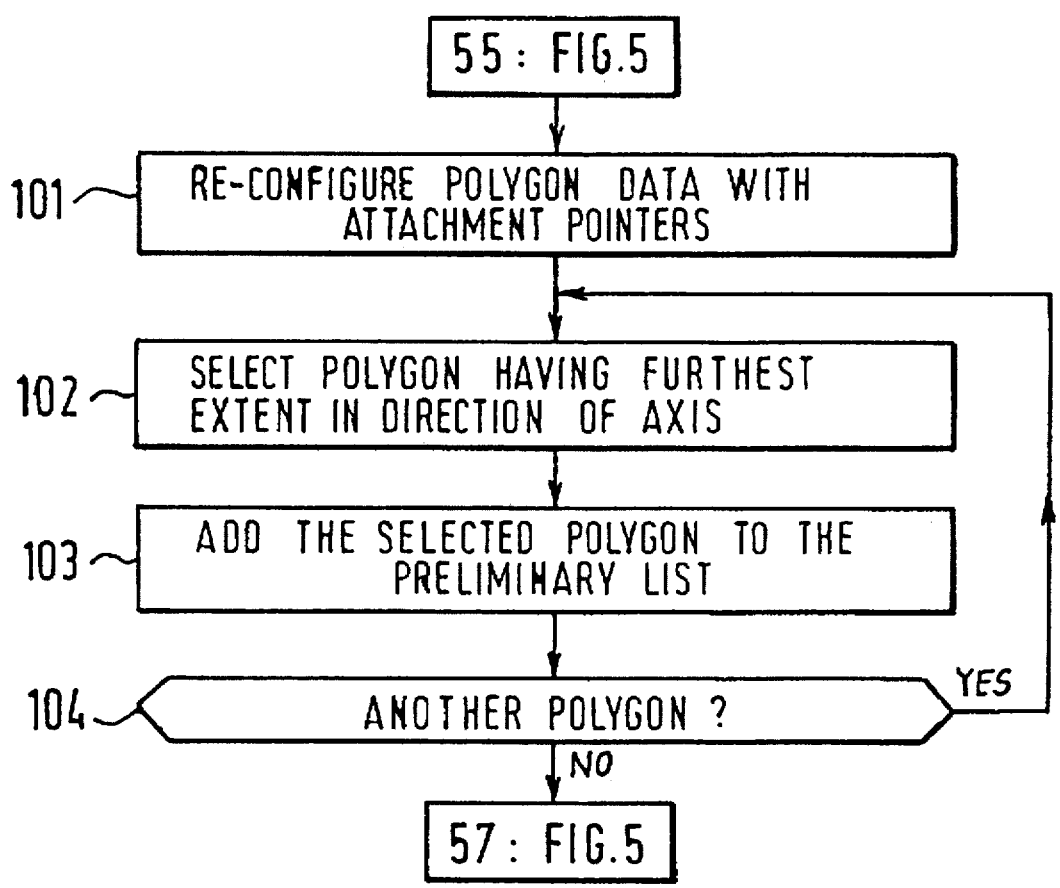

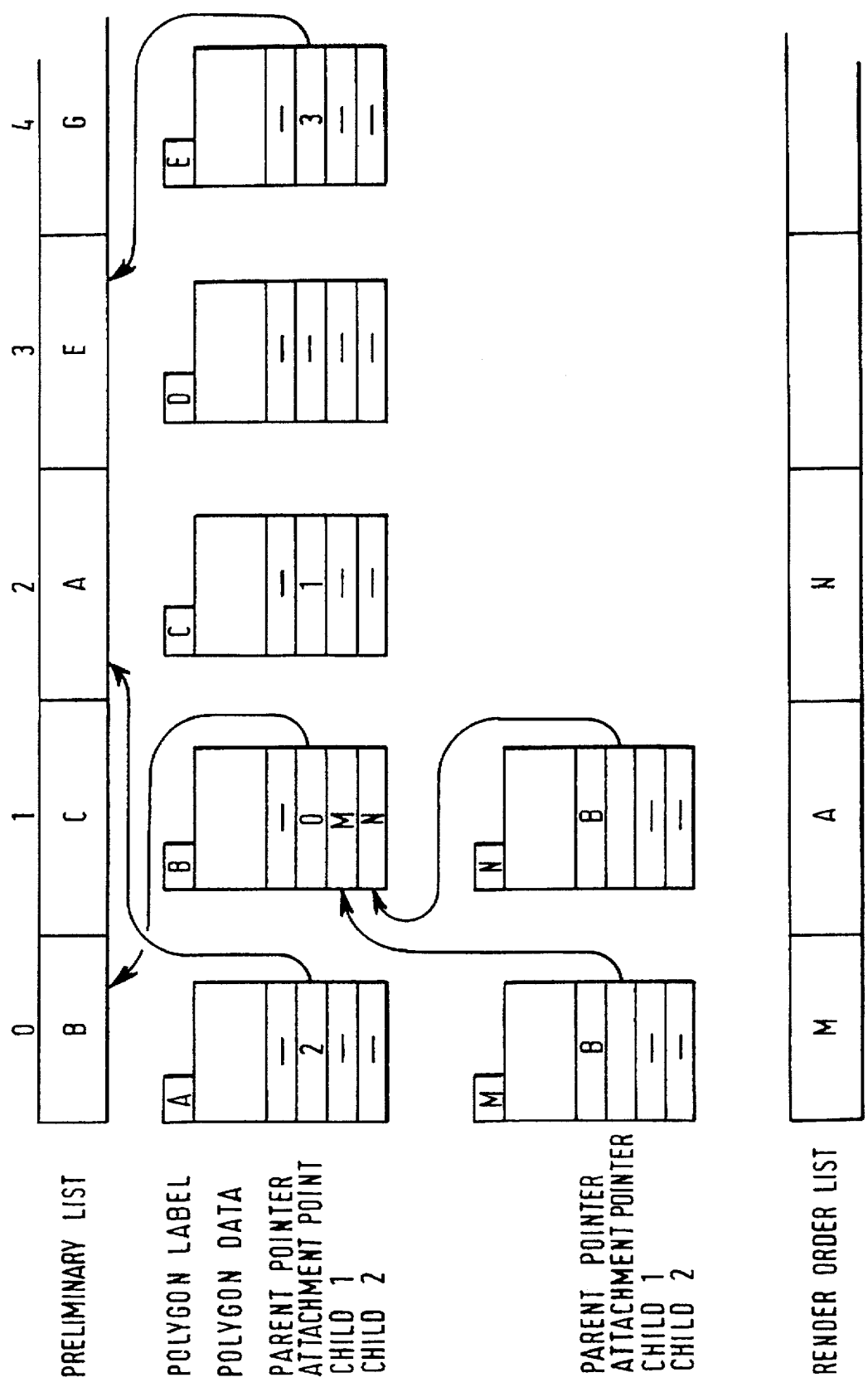

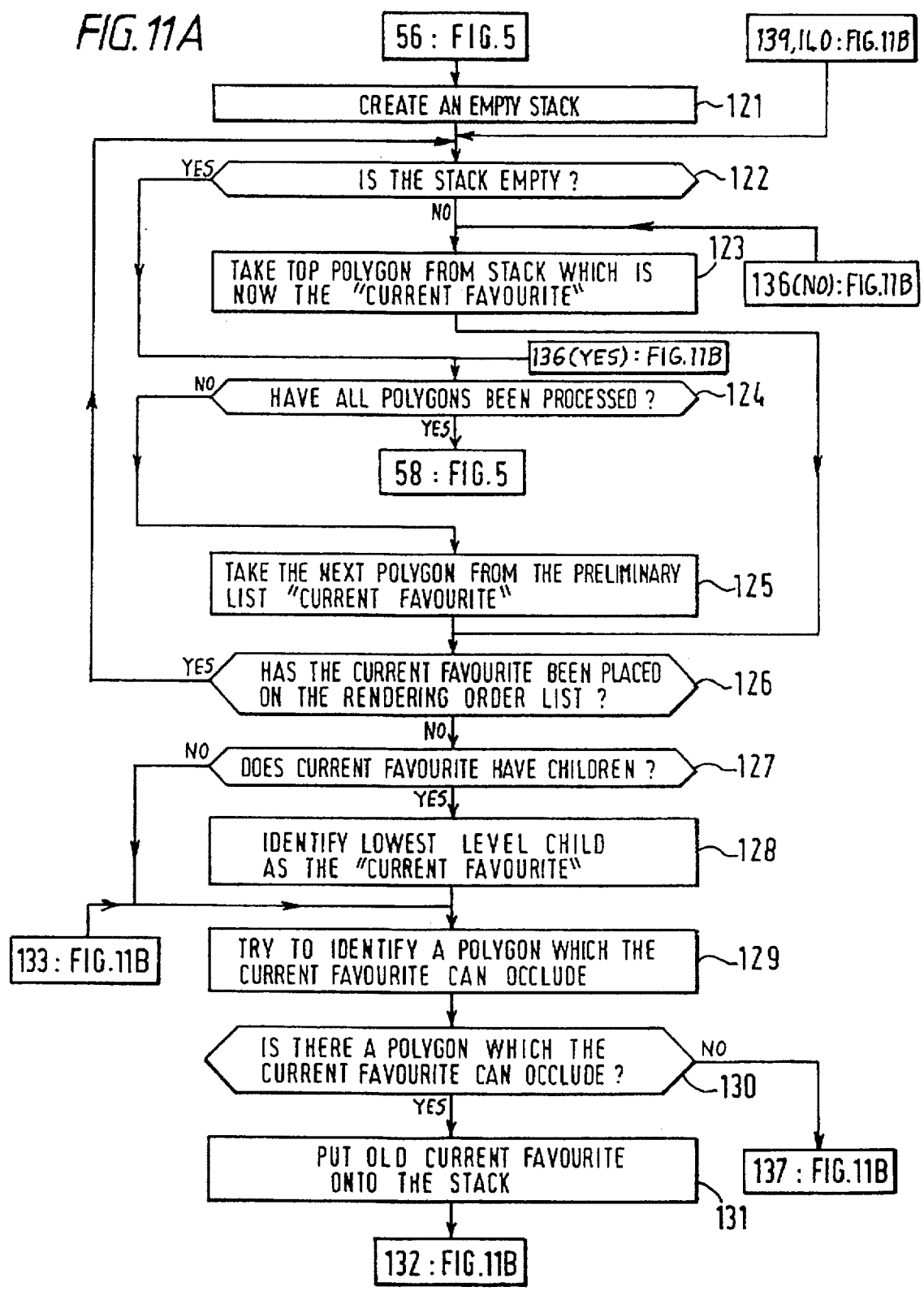

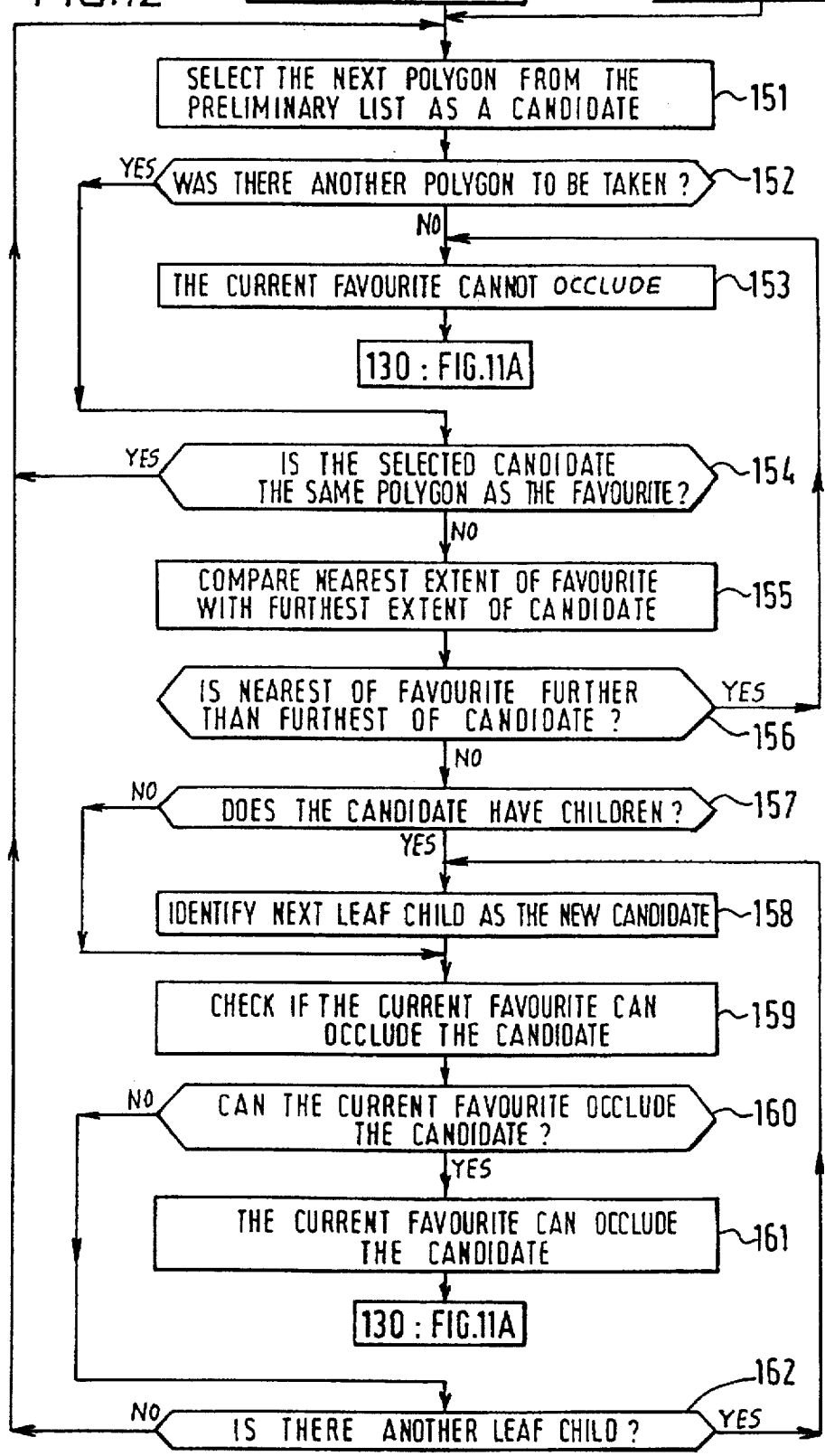

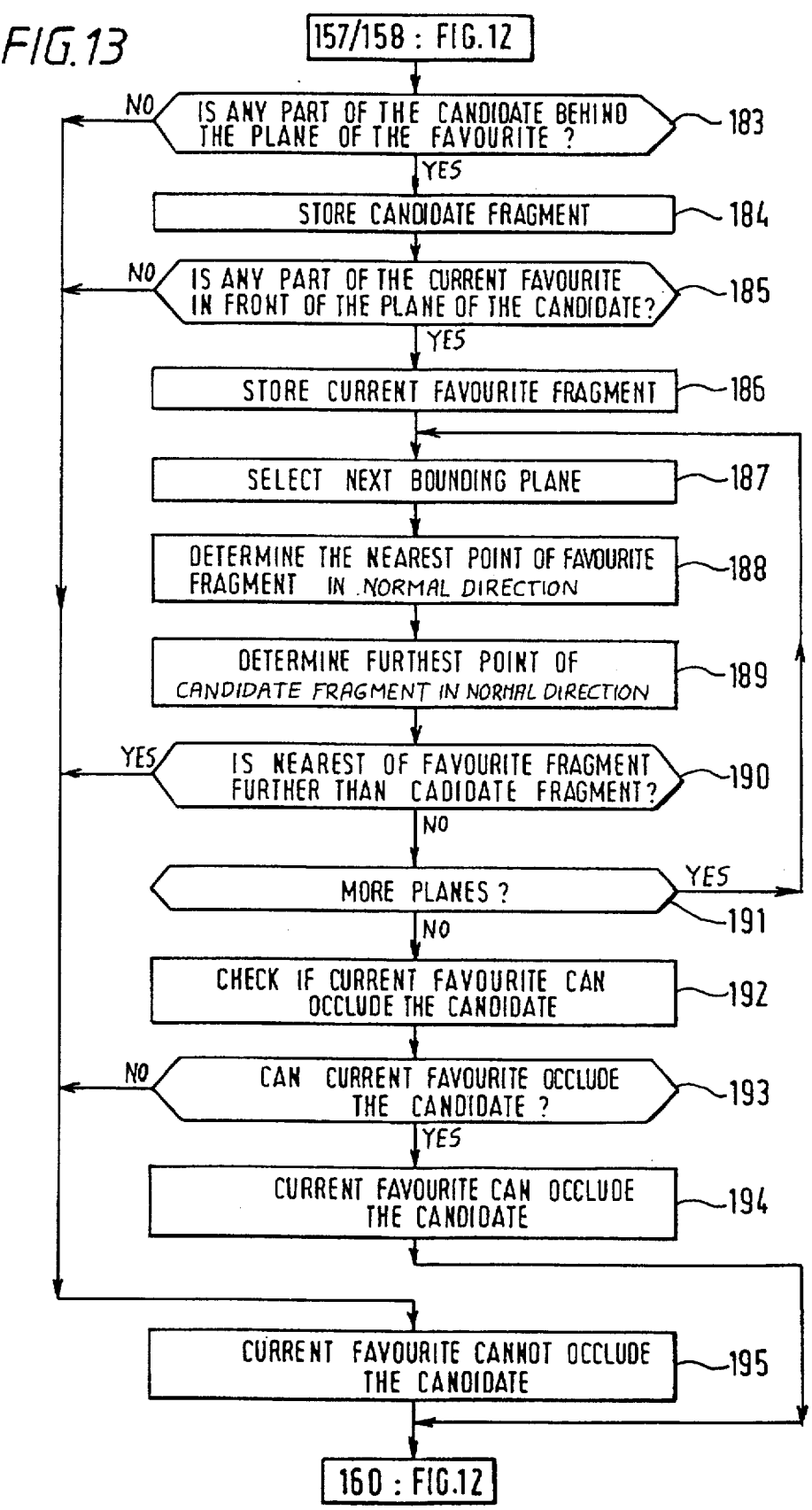

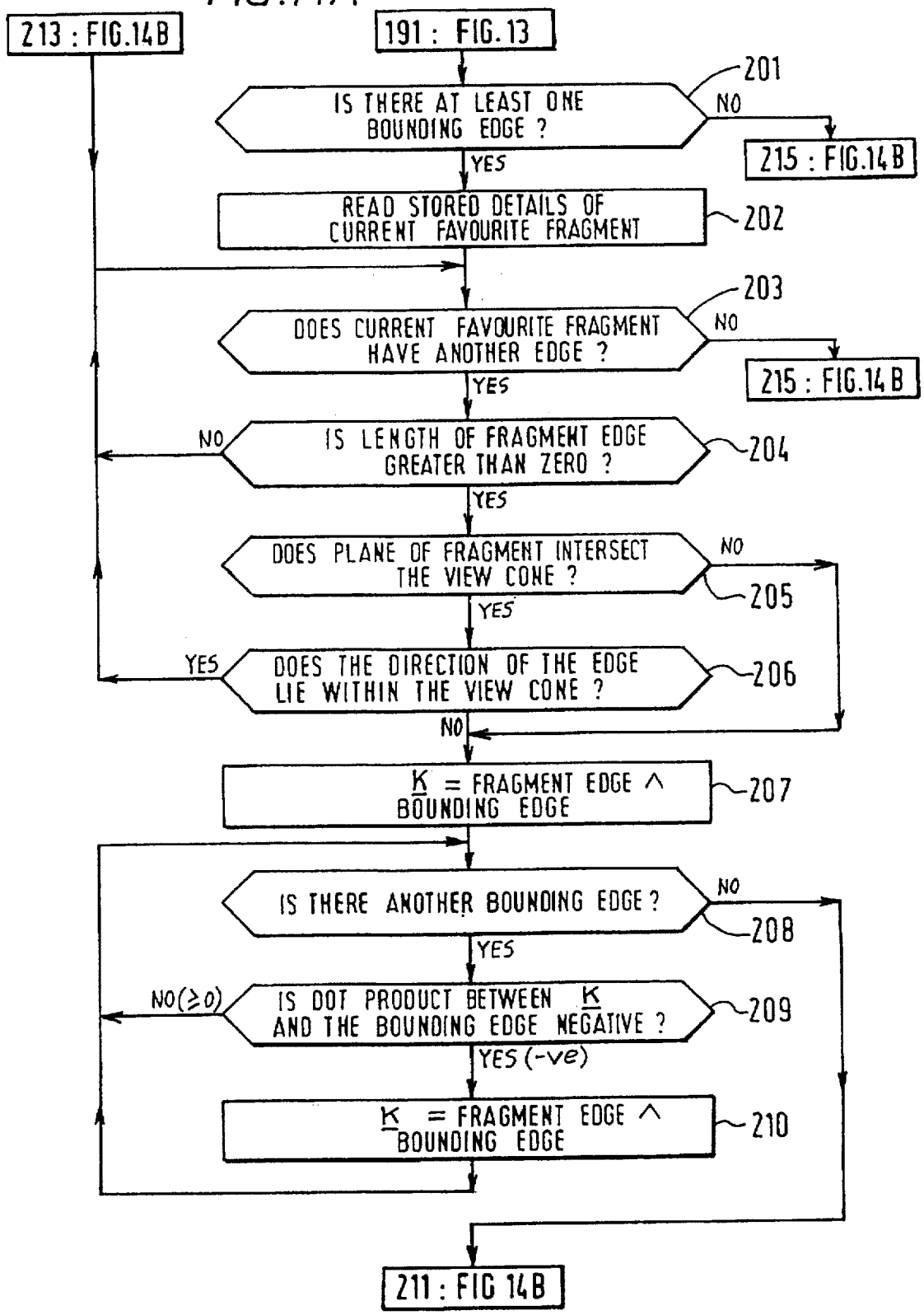

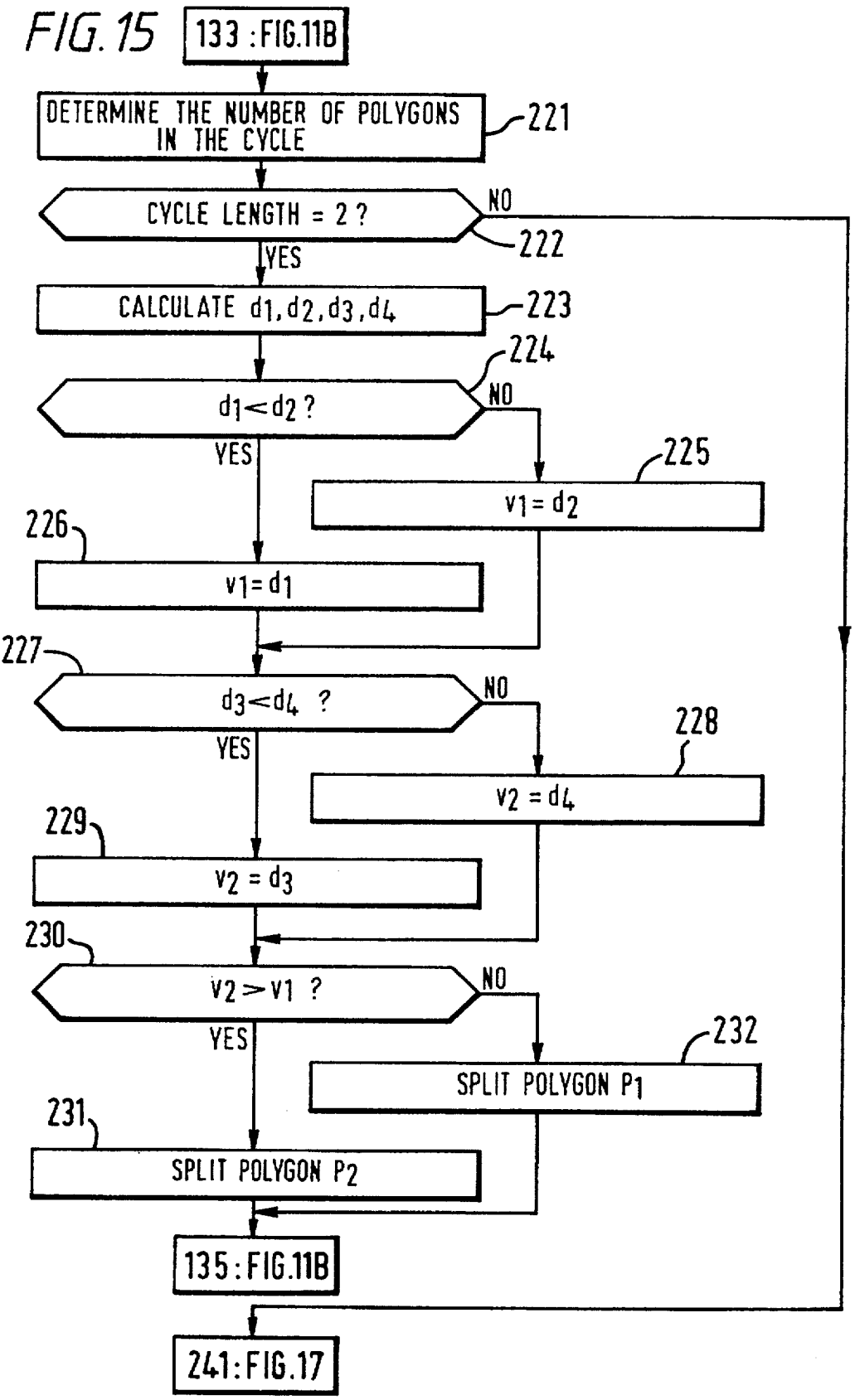

$d_1 < d_2 \therefore v_1 = d_1$ $d_3 < d_4 \therefore v_2 = d_3$ $d_1 > d_3 \; (v_1 > v_2) \therefore$ SPLIT POLYGON $P_1$

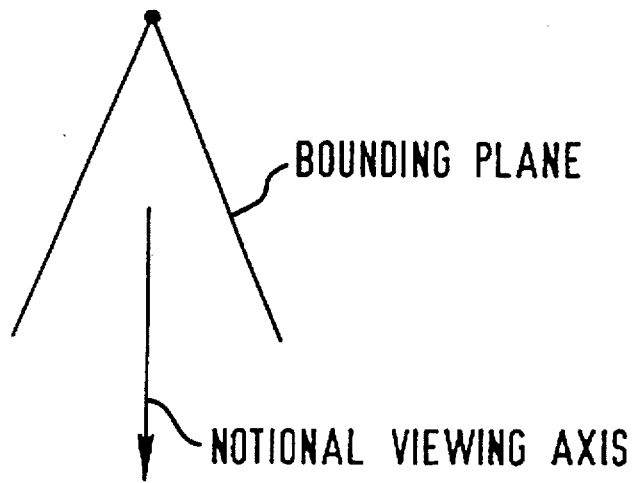
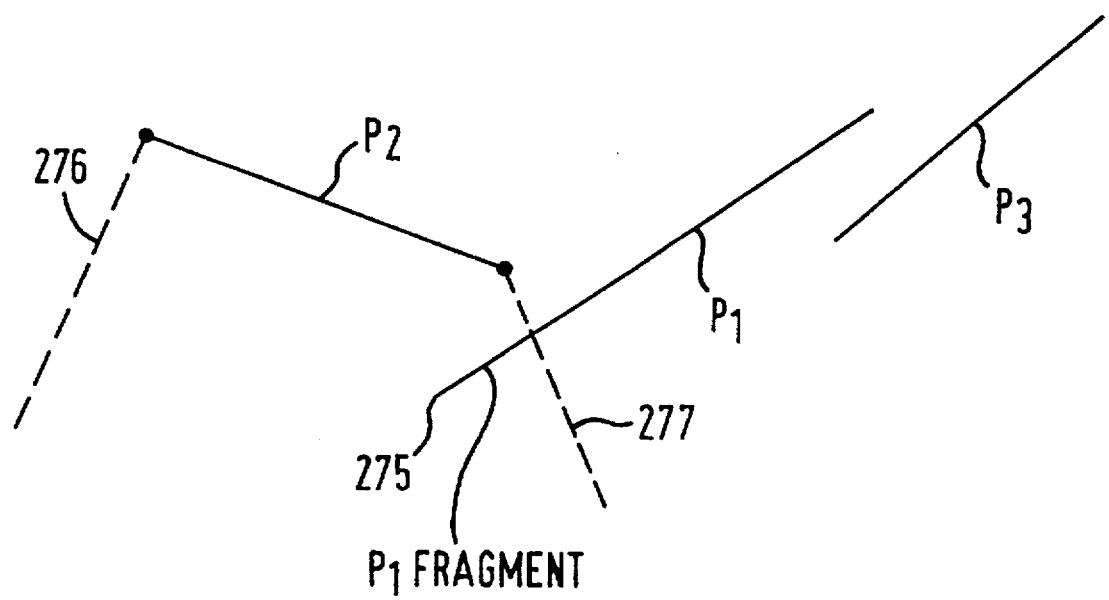
FIG. 20

5,684,936

METHOD AND APPARATUS FOR GENERATING A RENDERING ORDER FOR USE IN RENDERING IMAGES USING A PRE-PROCESSING TECHNIQUE

This application is a continuation of application No. 08/196,495, filed Feb. 15, 1994, now abandoned.

FIELD OF THE INVENTION

The present invention relates to a method and apparatus for image processing. In particular, the present invention relates to a method and apparatus for processing data representing the position of surface primitives such as polygons in three-dimensional space, for example to produce an ordered list for rendering views of said primitives in two-dimensional space.

BACKGROUND OF THE INVENTION

In an interactive three-dimensional graphics system, such as a system of the type disclosed in the Applicant's copending European Patent Publication No. EP-A-0531157 (not published at the first claimed priority date), data representing polygons is manipulated in three-dimensional space interactively, in response to input commands from an operator. Two-dimensional images are presented to an operator at a rate sufficient to maintain a closed feedback loop between the operator and the virtual three-dimensional environment.

A two-dimensional image is generated by rendering the three-dimensional image data onto a two-dimensional plane. For each view, "hidden surface removal" can be performed by ensuring that primitives which occlude other primitives are rendered into the two-dimensional plane either instead of the primitives which they occlude or at least after said occluded polygons. Often the occlusions are partial, therefore it is preferable to render occluded polygons prior to rendering the occluding polygons. In addition, totally invisible primitives may be culled and do not require further consideration during the rendering process. Thus, it can be appreciated that a very important aspect of the rendering process involves ensuring that the primitives are rendered in the correct order. However, determining the correct order for rendering, repeatedly for each iteration, would account for a considerable proportion of the available processing time.

A system for producing rendering order lists is disclosed in the aforesaid copending European Patent Publication, in which said lists are produced as a pre-process, using a topological sort, prior to interactive operation. If necessary, a plurality of view orientations are selected and a rendering order list is produced for each of these views. During interactive operation, one of these rendering order lists is selected by comparing the actual view orientation with the pre-processed orientations, to determine which is the closest fit. Thus, the computational overhead required during interactive operation is reduced significantly.

SUMMARY OF THE INVENTION

The invention provides a method or apparatus for processing data defining surface primitives in three-dimensional space, so as to determine an order for rendering said primitives which is suitable for a set of values of at least one viewing parameter, the method including: detecting the presence of a cycle; and breaking said cycle by splitting a primitive in said cycle into a plurality of smaller primitives.

Said order may be determined so as to produce a rendering order list, tree or directed graph for rendering a two-dimensional image.

For splitting a cycle of two or more primitives, techniques are disclosed for minimizing the probability of further cycles being created thereafter, and for minimizing the number of splits necessary. Minimizing the number of split polygons avoids increasing the computational overhead in subsequent processing stages, in comparison with certain known systems in which, as a preliminary step before determining any rendering order, all polygons are split where they intersect the plane of any other polygon.

The invention further provides methods and apparatuses for rendering two-dimensional images representing three-dimensional objects, in which rendering orders are determined using the techniques of the invention as set forth above.

BRIEF DESCRIPTION OF THE DRAWINGS

FIG. 2 shows the structure of a shape file defining the position of polygons making up an object;

FIG. 9 details the procedures for producing a preliminary list, identified in FIG. 5;

FIG. 10 illustrates the arrangement of polygon data, when parent polygons are split into children;

FIGS. 11A and 11B detail procedures for selecting polygons for the preliminary list in order to place them on the rendering order list or tree, including a step which attempts to identify a candidate polygon which is occluded by a current favorite polygon;

FIG. 12 details procedures for identifying a candidate polygon which the current favorite can occlude, identified in FIG. 11A;

FIG. 13 details procedures for checking if the current favorite can occlude the candidate, identified in FIG. 12;

FIGS. 14A and 14B detail further procedures for checking if the current favorite can occlude the candidate, identified in FIG. 13;

FIG. 15 details a procedure identified in FIG. 11B for breaking a cycle of two polygons and identifies a procedure for breaking a cycle with more than two polygons;

FIG. 20 illustrates the procedure detailed in FIG. 19; and

DETAILED DESCRIPTION OF EXEMPLARY EMBODIMENTS

Three-dimensional graphics systems provide a virtual three-dimensional environment in which objects, light sources and a viewing position may be manipulated within a notional three-dimensional space. The viewing position provides a window into the virtual three-dimensional world, often referred to as "world space". This world space itself only exists as data defining three-dimensional coordinates and other variables, such as colour and reflectivity. The two-dimensional image presented at the notional window must be created by processing the three-dimensional image data, in a procedure known as rendering.

Systems are known in which objects in the three-dimensional space are represented by the coordinate locations of selected points on the surface of the object. However, rendering consists of allocating picture element values to two dimensional regions of the image. Therefore, these coordinate points are converted into notional regions by effectively connecting the points by straight lines to provide a three-dimensional net of flat, two-dimensional polygons.

Other systems are known in which object surfaces can be defined by primitives other than flat polygons. The surface primitives may be planer (including not only polygons, but also disks and other shapes with curved edges, or they may be curved in three dimensions (for example curved patches defined mathematically). In the systems to be described below, only polygons are used as primitives but the reader skilled in the art will appreciate that in general the techniques described are applicable to other types of primitives.

The picture element values are generated on a polygon-by-polygon basis, until the whole object has been rendered. Thereafter, the picture element values generated by the rendering process are raster scanned to produce a video signal. However, in order to maintain the illusion of a solid three-dimensional object, it is essential that these polygons are rendered in an order which ensures that occluded polygons are rendered before the polygons which occlude them. Furthermore, this problem is made more acute by the fact that occlusion priority may change as changes are made to the viewing direction.

Figure 1:
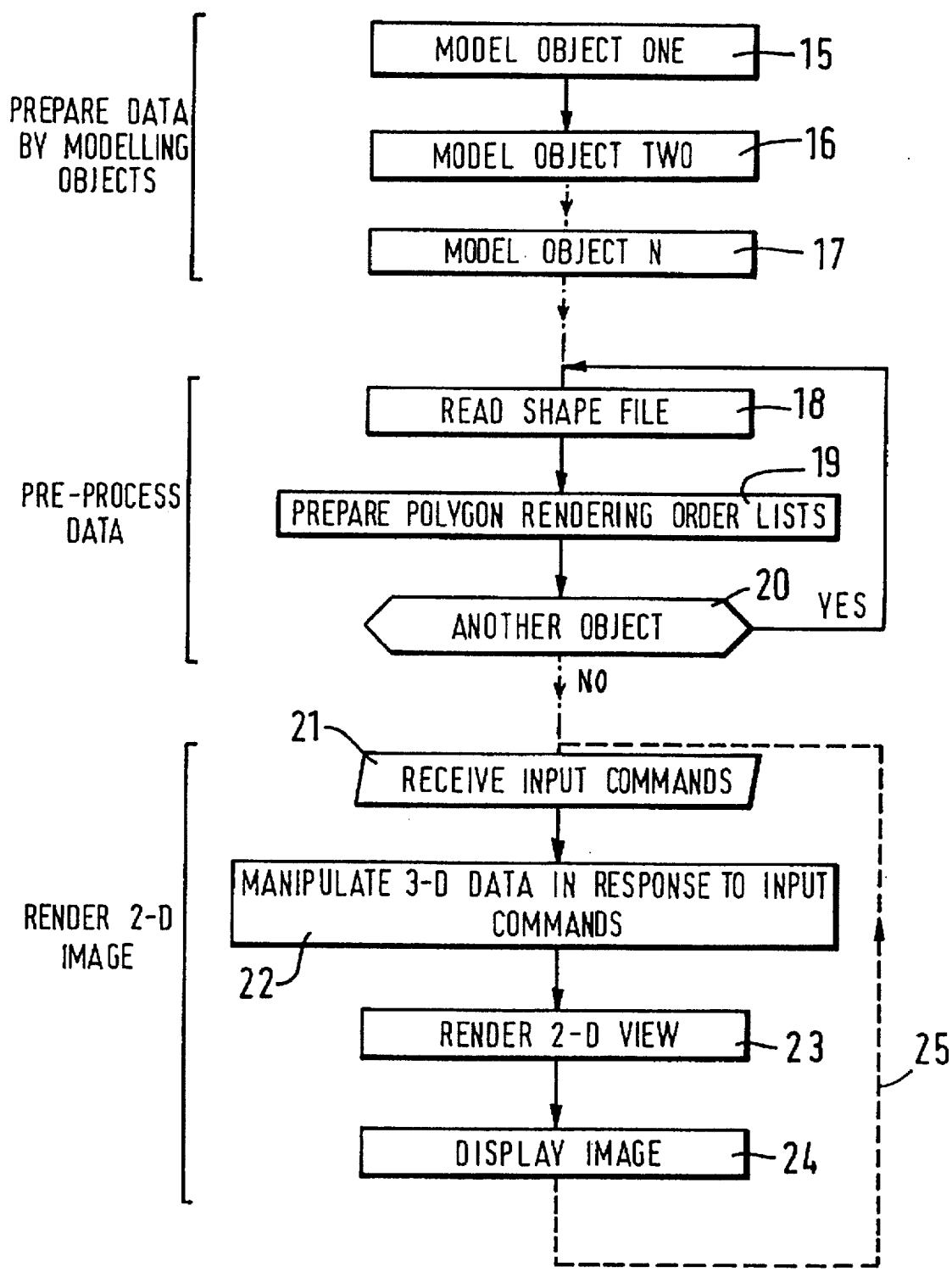
FIG. 1 shows stages of a three-dimensional interactive graphics environment.

The stages for providing a three-dimensional graphics environment are shown in FIG. 1. Initially, data defining objects are prepared. Thus, at step 15, a first object is modelled. Similarly, at step 16 a second object is modelled and so on until at step 17 an Nth object is modelled. Each object is modelled with reference to its own set of coordinates, often referred to as its own modelling space. Thus, each set of object data defines a shape, and the data required to reproduce said shape in a graphics environment is stored in a shape file.

The next stage consists of steps 18, 19 and 20, which form part of the pre-processing stage.

At step 18, a shape file is read which defines the shape of the object in terms of polygon vertices and polygon surface characteristics. At step 19, polygon rendering order lists are produced by processing the data defined by the shape file. Order lists may be required for a plurality of objects, and hence a question is asked at step 20 as to whether another object is to be processed. When answered in the affirmative, steps 18 and 19 are repeated, whereby the shape file for the next object is read.

When order lists have been prepared for all of the objects, it is possible to enter the rendering stage. At step 21 input commands are received which essentially define lighting and view parameters. In response to these input commands, the three-dimensional data representing the objects is manipulated at step 22 and at step 23 a two-dimensional rendition, based upon the position and orientation of the viewer, is generated, resulting in an image being displayed at step 24. In some environments single images, usually at a very high definition, are produced for a particular view position. In an interactive three-dimensional environment, parameters are adjusted in response to operator commands and new views are generated repeatedly in interactive time. Thus, steps 21 to 24 are performed repeatedly, as indicated by dotted line 25. A summary of a particular implementation of a graphics system is given with reference to FIGS. 21 and 22 towards the end of this description.

As previously stated, objects are considered as being made up of connected polygons, with adjacent polygons sharing common vertices. Thus, object data defined in shape files is arranged to define a plurality of connected polygons.

Many different data structures are possible for the storage of object data in a shape file. One possible structure is detailed in FIG. 2, in which the nature of a data entry is defined by its location within the structure.

The first line of the shape file shown in FIG. 2 includes an integer value N(V) which defines the number of vertices present within the object and a second integer value N(P) which defines the number of polygons making up the object. Subsequent lines consider the coordinate location of the vertices. For example, the second line of the shape file defines the coordinate locations for the first vertex, identified as V1. The first value on this line is a floating point value X(V1) representing the X coordinate of vertex V1. This is followed by a similar representation Y(V1) for the Y coordinate of said vertex and Z(V1) for the Z coordinate of the first vertex. Similarly, the next line includes values X(V2), Y(V2) and Z(V2), being the X, Y and Z coordinates of the second vertex V2 and so on until the final vertex has been considered, defined by values X(Vm), Y(Vm), Z(Vm), where m=N(V).

After providing coordinate locations for all of the vertices, the polygons are defined in terms of these vertices. The first polygon is considered as P1, the second as P2 etc. and so on until polygon Pq, where q=N(P). For the first polygon P1, the first entry is an integer value $N(V)_1$ specifying the number of vertices which make up the polygon P1. Thereafter, each vertex forming part of the polygon is specified sequentially according to the following procedure. The vertices making up each polygon are listed by considering the front face of the polygon and traversing around the polygon in a counterclockwise direction. Thus, each vertex for the polygon is identified, from Va1 to Vn1, say, by traversing counterclockwise around the polgon's front face, until $N(V)_1$ vertices have been listed.

Polygon P1 may be a triangle consisting of three vertices. Therefore, the first value $N(V)_1$ for that polygon will be equal to three. The vertices making up the polygon may, for example, be vertices V2, V3, V4 when traversing anticlockwise around the front face. Therefore, the entries which follow the entry defining the number of vertices are integer values, each of which refers to a previously defined vertex.

After listing the vertices which make up the polygon, each entry for a particular polygon includes values defining the reflectivity of the polygon in response to light. A first value, Ka, represents reflectivity in response to ambient light, while the second (Kd) and third (Ks) values represent reflectivity coefficients relating to individual light sources. The second entry Kd defines diffuse reflectivity, while the third value Ks defines specular reflectivity, that is to say, it defines the shininess of the surface of the polygon. Reflectivity values may be stored as floating point values or as fixed point values, as described in our copending European patent application 93307772.9 (agent's ref. 2227830).

The final entry for each polygon defines the color of the polygon, and one of many schemes may be adopted for this purpose. For example, a 24 bit value may define the color in RGB colour space or, alternatively, fewer bits may be allocated, which subsequently address a look-up table. Color data may be stored in a non-linear look-up table, as described in our copending European patent application 93307811.5 (agent's ref. 2227730).

Thus, a list of vertices, reflectivity values and color values are defined for each polygon making up the object, from P1 to Pq. Finally, the shape file includes comments, and any data included after the colour has been defined for polygon Pq is treated as a comment.

Figure 3:
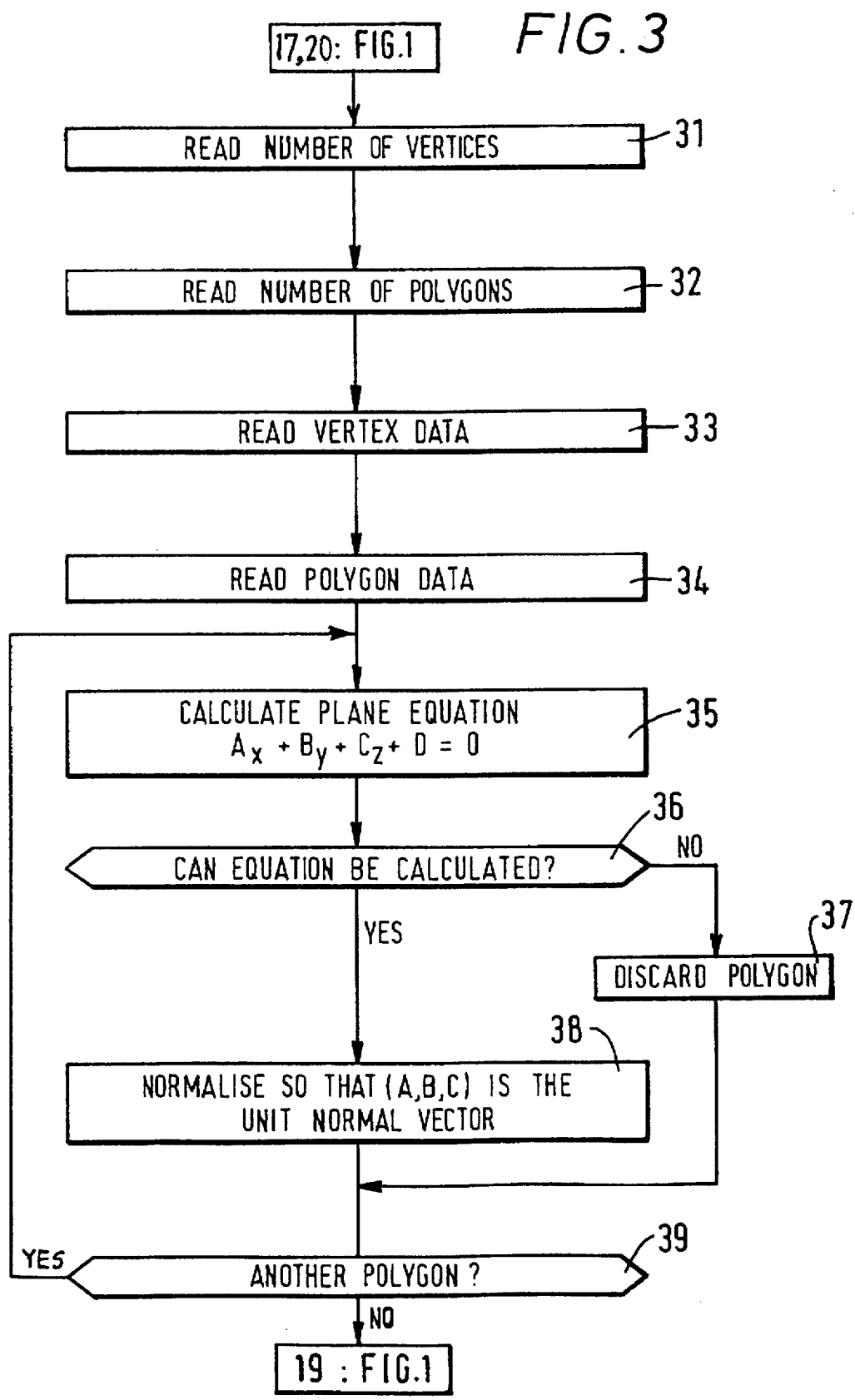
FIG. 3 illustrates procedures for reading the shape file shown in FIG. 2.

The step of reading a shape file, step 18 in FIG. 1, is detailed in FIG. 3. At step 31, the value N(V) representing a number of vertices in the object is read, and at step 32 the value N(P) representing the number of polygons forming the object is read. At step 33 the vertex data defining the X, Y and Z coordinates for each vertex is read, and at step 34, the polygon data is read specifying which of the defined vertices make up each polygon, along with reflectivity values and color values for each polygon. The comments are not read and are thereby effectively discarded at this stage.

Each polygon may be considered as lying within an infinite plane specified within the three-dimensional world space. Each of these planes may be defined by the following plane equation:

$$Ax+By+Cz+D=0$$

in which A, B, C and D are parameters defining the position of the plane. The values A, B and C also define a vector which is normal to, that is to say perpendicular to, the plane of the polygon, pointing out from the front face of the polygon. Thus, in addition to identifying the orientation of the plane, the normal vector also identifies which of the polygon faces is its front face.

Thus, after all of the polygon data has been read at step 34, each polygon is considered in turn. At step 35 an attempt is made to calculate the plane equation for the polygon. A question is asked at step 36 as to whether the plane equation can be calculated and if this question is answered in the negative, the polygon is discarded at step 37.

If the plane equation has been calculated at step 35, the resulting surface normal vector (A, B, C) is processed ("normalized") at step 38 to define a similarly orientated vector but of unit length. Data defining the unit normal vector is added to the polygon data and, in addition to being used to prepare polygon order lists at step 19, it is also used during the rendering procedures at step 23. In particular, the unit normal vectors are required to determine lighting values when lighting is calculated. As described in our copending European application 93307772.9 (agent's ref. 2227830), lighting may be calculated in the object's own modelling space.

After a unit normal vector has been calculated at step 38, a question is asked at step 39 as to whether another polygon is present and when this question is answered in the affirmative, the plane equation for the next polygon is calculated at step 35. After all of the polygons have been considered, the question asked at step 39 is answered in the negative, allowing control to be returned to step 19 of FIG. 1.

Thus, the procedure detailed in FIG. 3 reads the shape file, calculates the unit normal vector for each polygon and discards any comments which may be present.

Step 19 of FIG. 1 consists of the preparation of polygon rendering order lists, and will now be described in detail. The viewer may be considered as a camera, the characteristics of which may be completely defined by three parameters. These parameters consist of the direction in which the camera is pointing, the position of the camera and the field of view of the camera. Each rendering order list is associated with a set or sets of camera directions. Ideally, all the possible camera directions should be grouped into as few sets as possible, resulting in a minimum number of rendering order lists from which a selection is made. In general, all camera parameters may influence what is associated with a given rendering order list, but in the present embodiment, the most influential parameter is considered to be camera direction which, independently of absolute camera position, defines the direction in which the viewing axis of the camera is pointing. The area covered for any particular direction is dependent upon the field of view and in some situations it may not be possible to produce a complete order list, unless account is also taken of camera position. In these situations, the list takes the form of a tree or directed graph and the selection of a particular branch is made with reference to viewing position. Thus, branching occurs at positions where it is not possible to complete the list with reference to direction alone. At the branch point, a question must be asked relating to the absolute position of the camera and as a result of this question, further listing continues down one or other of two possible branches.

During interactive operation, a particular rendering order list is selected with reference to the particular orientation (viewing direction) of the camera. A number of rendering order lists were produced, each with reference to a so-called notional viewing axis, to be described later. A list is selected in this embodiment by assessing which of several notional viewing axes is closest, in direction, to the actual viewing direction. For simplicity, the term "list" will be used hereinafter to include lists, trees, directed graphs and equivalent data structures.

Figure 4:
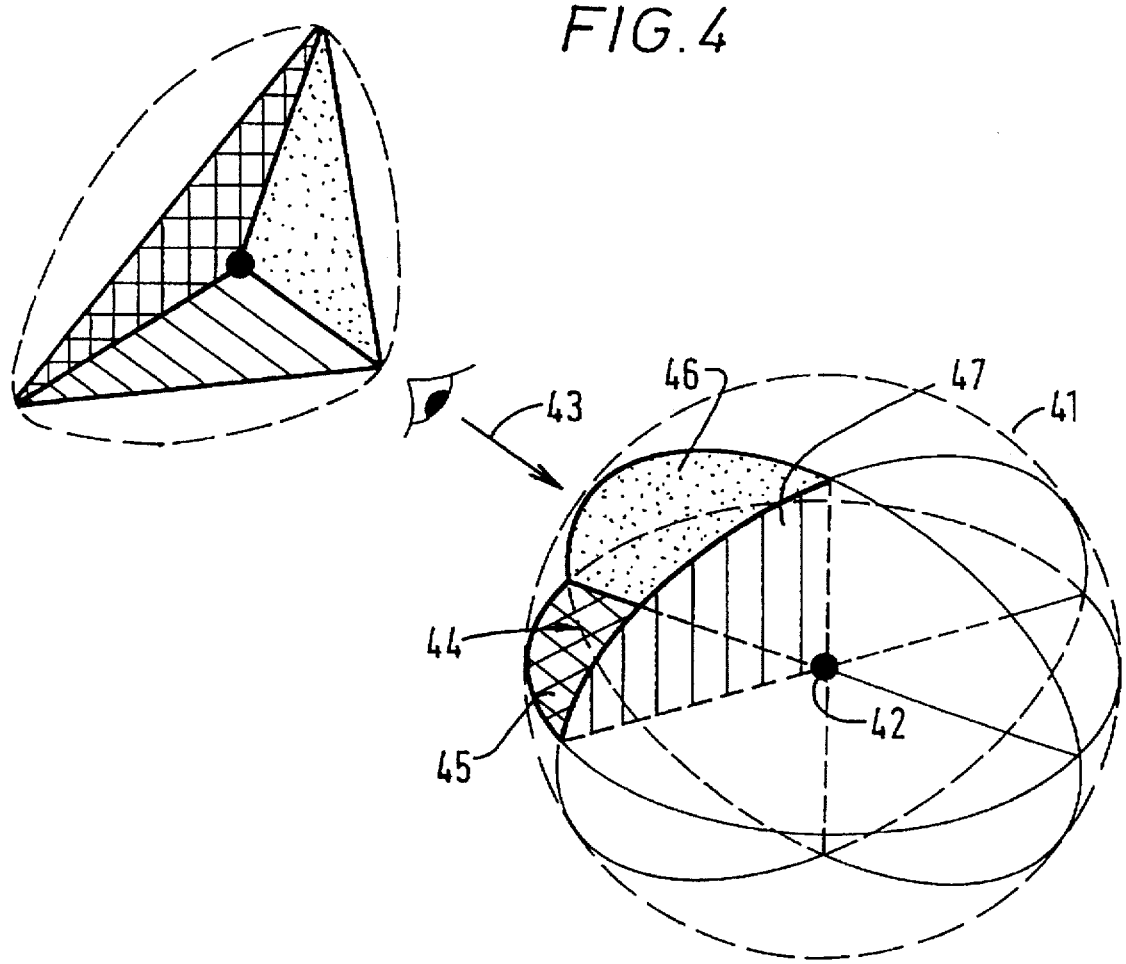
FIG. 4 illustrates notional viewing directions and bounding planes.

A direction space is represented in FIG. 4, in which each point on sphere 41 represents a direction from said point to the origin 42 at the center of the sphere.

The number of rendering order lists (trees or graphs) required will depend upon the object geometry. However, for the processes defined by the present embodiment to be successful, a minimum possible number of lists is 4. The number of notional viewing axes, and hence the number of lists produced, is selected by an operator and in the examples shown in FIG. 4, eight viewing axes have been selected, resulting in the sphere 41 being divided into eight segments.

A notional viewing axis 43 is one of the eight notional viewing axes and it defines a segment 44 bounded by a horizontal splitting plane 45, a first vertical splitting plane 46 and a second vertical splitting plane 47. Thus, the segments under consideration are not defined by a view cone but by the intersection of planes. This definition of directions of interest significantly facilitates data manipulations and significantly speeds up processing time.

Figure 5:
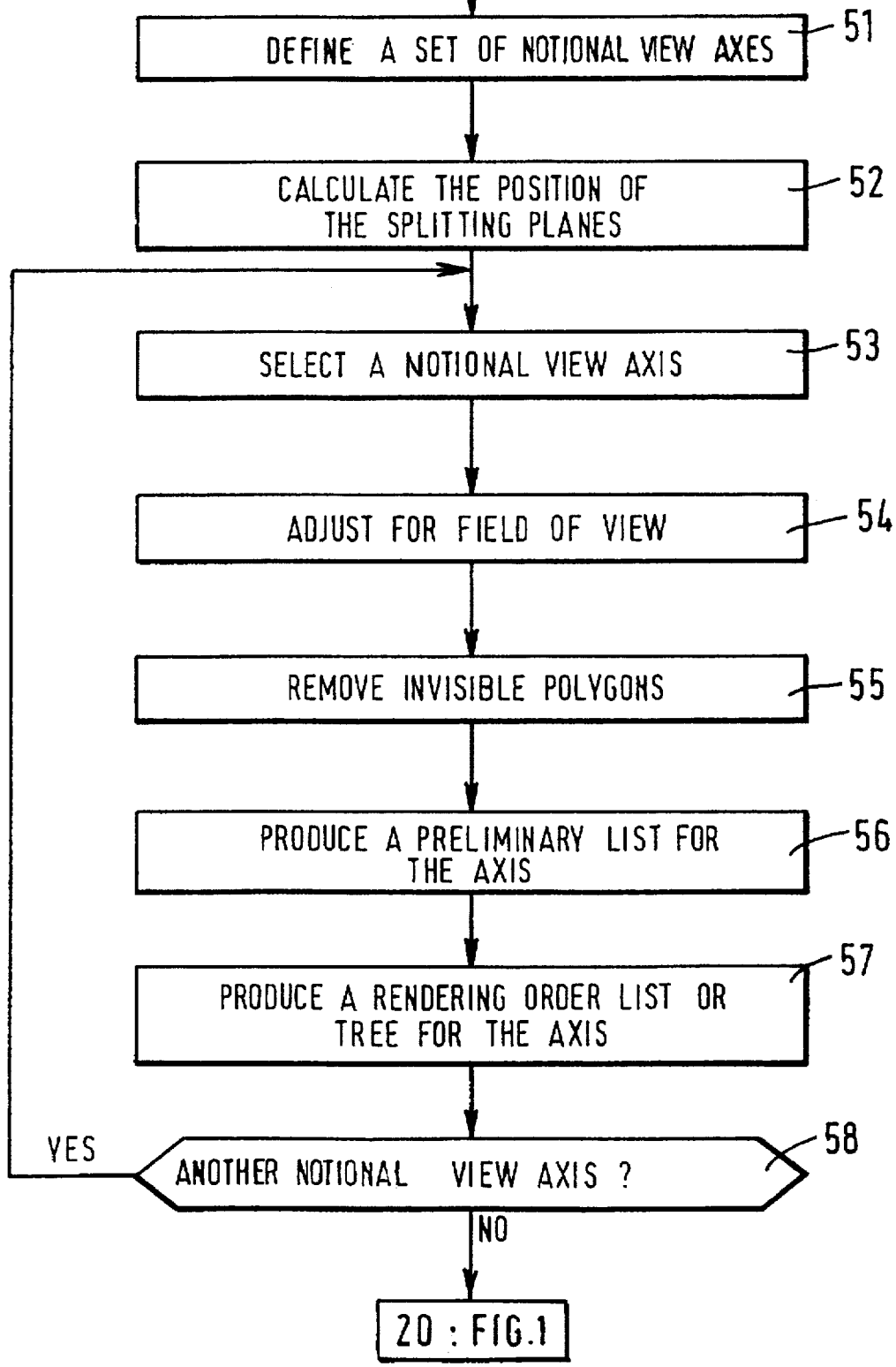
FIG. 5 illustrates the preparation of rendering order lists, including steps for calculating the position of splitting planes, adjusting for field of view, removing invisible polygons, producing a preliminary list and producing a rendering order list.

Step 19 of FIG. 1, concerned with the preparation of polygon rendering order lists, is detailed in FIG. 5. At step 51, a set of notional viewing axes is selected. The number of axes present in the set determines the number of rendering order lists from which a selection is made during interactive operation. As previously stated, this selection is made in response to operator commands. Over time, an operator will be accustomed to identifying a preferred set of axes, dependent upon the nature of the geometry of the object under consideration.

At step 52, the positions of the splitting planes are determined, based upon the position of the viewing axis at step 51. Thus, the view axis 43, for example, would result in the position of splitting planes 44, 46 and 47 being calculated at step 52. Step 52 will be described in more detail below with reference to FIG. 6. Referring to FIG. 4, however, it is clear that each plane may be considered as being shared with two notional viewing directions. The system is arranged such that all of the actual splitting planes which define a region for a particular notional viewing axis are calculated for that axis. Thus, as far as the system is concerned, the front face of plane 46 (required for processing steps relating to notional viewing axis 43) is a completely different plane from its associated back face, required to be calculated for the adjacent notional viewing axis.

In addition to having a parameter defining direction, a notional camera or eye also has a field of view such that, for a particular direction of a central viewing axis, other directions are also visible within a field of view cone. Thus, when directed in an orientation which lies along one of the viewing planes shown in FIG. 4, for example, the camera or eye can see in some directions which are within the segment bounded by that plane. However, to some extent, the camera or eye can also see in other directions, which lie on the other side of the viewing plane, due to its field of view. Furthermore, as the field of view increases, the extent to which the camera can see in other directions, outside the bounded segment, also increases.

At step 54, the position of the bounding planes is adjusted to take account of the field of view. This is described in more detail below with reference to FIG. 7. In order to account for the field of view, the bounding planes are displaced away from the notional viewing axis, thereby increasing the size of the segment under consideration.

For each notional viewing axis, it is likely that some of the polygons will always be back-facing and, therefore, effectively invisible. Thus, at step 55 invisible polygons of this type are removed. This is described in more detail below with reference to FIG. 8.

At step 56 a preliminary list is produced by considering the distance of the furthest vertex of each polygon in the direction of the notional viewing axis. This is described in more detail below with reference to FIG. 9. The preliminary list does not represent the final rendering order list; but its purpose is to facilitate the production of such a rendering order list. The purpose of the preliminary list is to allow polygons to be selected in a logical order during processing stages for the development of a full rendering order list which, overall, significantly reduces computational overhead. By making comparisons with polygons in the order defined by the preliminary list, the number of comparisons required to produce a final rendering order list is significantly reduced.

At step 57, selections are made from the preliminary list and a final rendering order list is produced for the particular notional viewing axis under consideration. This is described in more detail below with reference to FIGS. 11A and 11B.

At step 58, a question is asked as to whether another notional viewing axis has yet to be considered (requiring another rendering order list to be produced) and when answered in the affirmative, control is returned to step 53.

Eventually, the question asked at step 58 will be answered in the negative (rendering order lists having been produced for each of the notional viewing axes) in which case control will be returned to step 20 of FIG. 1.

Figure 6:
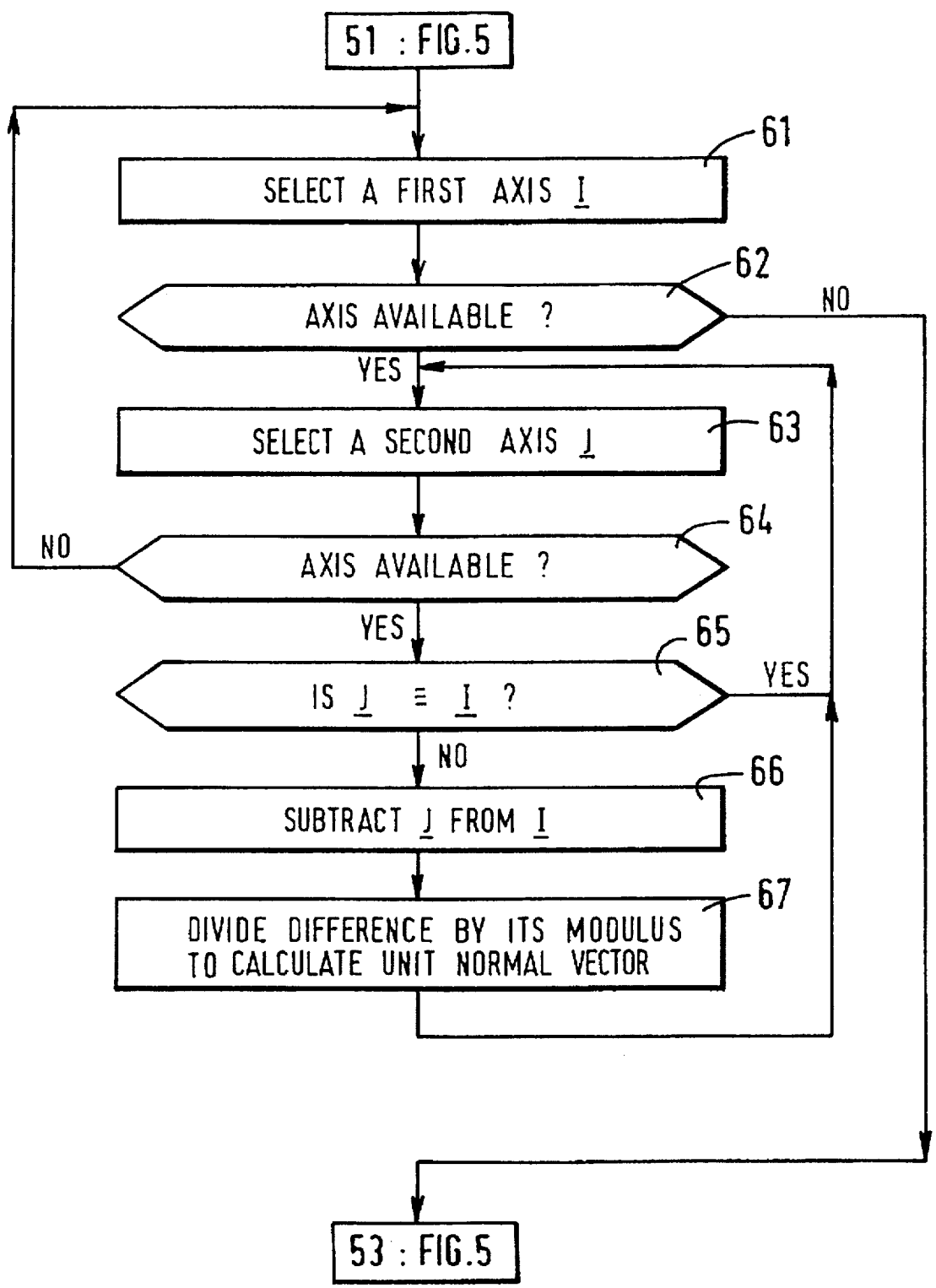
FIG. 6 details the steps involved for the calculation of the position of splitting planes, identified in FIG. 5.

FIG. 6 details the stages for calculating the position of the splitting planes, identified as step 52 in FIG. 5. At step 61 a first axis is selected which, having a particular direction, may be considered as a vector I. Vector I could be the notional viewing axis 43 shown in FIG. 4. A question is asked at step 62 as to whether an axis is available. This will be answered in the affirmative on the first iteration.

At step 63 a second axis, J, is selected, although during this selection no measures are taken to avoid selecting the previously selected axis. A question is again asked at step 64 as to whether an axis is available which, again, would be answered in the affirmative on the first iteration.

Given that step 63 could have selected the same axis as the axis selected at step 61, a check is made at step 65 to determine whether axis J is equal to axis I. If answered in the affirmative, control is returned to step 63 and another axis is selected as axis J.

When the question asked at step 65 is answered in the negative, vector subtraction is performed, in which axis J is subtracted from axis I. For the purposes of this calculation, it is assumed that vector I has the same magnitude as vector J.

Referring to FIG. 4, it can be seen that the vector subtraction may be performed on vector 43 with a similar vector on the other side of plane 46. The vector subtraction results in a further vector, which effectively connects vector 43 with its adjoining vector and lies in an orientation which is perpendicular to plane 46. Since the vectors I and J are of equal length, the resulting vector is normal to plane 46. Furthermore, its orientation is such that it is pointing towards the I vector rather than to the J vector.

At step 67, the vector (I-J) calculated at step 66 is divided by its modulus, so as to calculate the equivalent vector of unit length. Thus, plane 46 is defined by means of its unit normal vector and control is returned to step 63, allowing a further second axis J to be selected. Thus, on this occasion, a vector may be selected which allows plane 44 to be defined and, subsequently, plane 47 is defined.

When all of the J vector axes have been considered for a particular I vector axis, the question asked at step 64 is answered in the negative and control is returned to step 61.

On control being returned to step 61, a further axis is selected as the I axis and the process is repeated. Thus, the process described with reference to notional viewing axis 43 and the notional viewing axis on the other side of plane 46 is effectively performed again as part of another iteration, in which the roles of these two vectors are reversed. Thus, the position of plane 46 is effectively determined again, but this time the unit normal vector extends from the back face of the plane, thereby defining the plane in relation to the other notional viewing axis.

Eventually all of the notional viewing axes will have been considered as a first axis I and the question asked at step 62 will be answered in the negative, resulting in control being directed to step 53.

Thus, the viewing directions associated with a particular notional viewing axis are defined by bounding planes and these bounding planes are calculated by performing arithmetic operations upon vectors defining a finite number of other notional viewing axes.

Each bounding plane divides all possible viewing directions into a range of directions which will not be associated with the particular notional viewing axis and a range which may be associated with that axis. The range which is not excluded by the plane is identified by the direction of the unit normal vector of that plane, which points towards the allowable viewing directions. The actual range of associated viewing directions is that which will not be excluded by any bounding plane having a unit normal vector pointing towards the notional viewing axis I.

The bounding planes define all of the directions along which a camera can see when considering a particular range of camera orientations (viewing directions) associated with a notional viewing axis 43. Thus, the regions defined by the bounding planes originally only take account of view direction. In some situations this would be unsatisfactory because no account is taken of the field of view. Widening the segment defined by the bounding planes is performed to take account of the field of view, which results in the planes being adjusted while at the same time retaining their geometrical configuration as flat planes.

Figure 7:
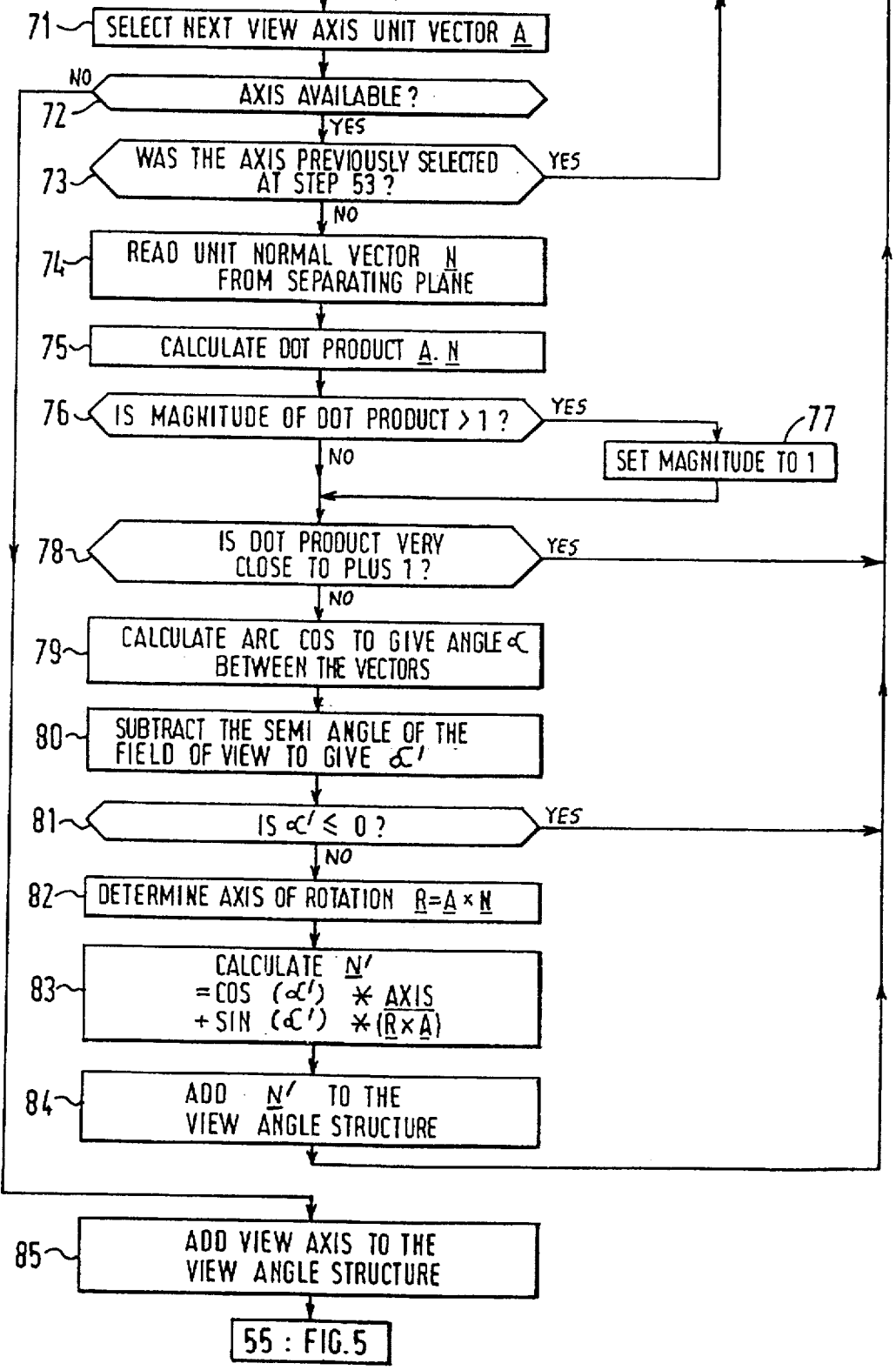
FIG. 7 details the procedures for adjusting for field of view, identified in FIG. 5.

In accordance with the procedures detailed in FIG. 7, account is taken of the field of view by adjusting the bounding planes by an amount specified by the field of view semi angle; this being the angle between the central viewing axis of the field of view cone and the periphery of the cone. This operation does not perfectly reflect the extension due to field of view because the field of view region is actually conical. Consequently, the planes are adjusted a little more than they actually need to be in principle, so as not to over-complicate the geometry of the segment under consideration.

Referring to again FIG. 5, the adjustment for field of view at step 54 is performed separately for each notional viewing axis; step 54 being within the axis selection loop. Therefore, referring to FIG. 4, after the bounding planes for neighbouring segments have been adjusted, they will not be coincident and the segments will actually overlap.

The procedures for adjusting the field of view are detailed in FIG. 7. A notional viewing axis has been selected at step 53 and calculations are made with reference to other viewing axes. At step 71 one of the other viewing axes is selected and, if not already in this form, its unit vector is calculated and identified as A.

At step 72 a question is asked as to whether an axis was available and, on the first iteration, this question will be answered in the affirmative. No measures are taken to ensure that the axis selected at step 71 is not the same as the notional viewing axis selected at step 53. Therefore, a question is asked at step 73 as to whether the axis selected at the step 71 is the same as the axis selected at step 53. If this question is answered in the affirmative, control is returned to step 71 and another axis is selected. When answered in the negative, the unit normal vector N defining the plane separating the two selected axes is read. This unit normal vector was calculated at step 67 and will have been stored at this step, allowing it to be read at step 74.

At step 75, the dot product of unit vectors A and N is calculated and, given that both of these vectors are of unit length, their dot product will define the cosine of the angle between them.

At step 76, a question is asked as to whether the modulus or magnitude of the dot product calculated at step 75 is greater than unity, that is to say, whether said magnitude is greater than plus 1 or less than minus 1. If the magnitude of the dot product is greater than unity, this should be clue to machine rounding errors and the magnitude is set equal to unity at step 77. If required, additional checks may be made to identify values which clearly reflect the presence of a logical error within the system.

At step 78 a question is asked as to whether the dot product is very close to plus one (for example, if it is greater than 0.9999) and if this question is answered in the affirmative, control is returned to step 71 and another axis is selected.

If the question asked at step 78 is answered in the negative, the arc cosine of the dot product is calculated at step 79 to determine the value of the angle alpha between the two vectors.

At step 80, the semi angle of the field of view is subtracted from the value of angle alpha, calculated at step 79, giving a new value alpha', representing the angle from the other notional viewing axis after the plane has been adjusted to take account of field of view.

At step 81 a question is asked as to whether alpha' is smaller than or equal to zero. If this question is answered in the affirmative, control returns to step 71.

If the question asked at step 81 is answered in the negative, an axis of rotation R is calculated by calculating the cross product of the vectors A and N. At step 83 a new unit normal vector, N', is calculated to define the orientation of the bounding plane after it has been displaced to take account of the field of view. This new unit vector may be determined for example by adding (i) the cosine of the angle alpha' multiplied by the notional viewing axis vector A; and (ii) the sine of the angle alpha' multiplied by the cross product of R and A.

At step 84, the adjusted unit vector N' is noted and control is then returned to step 71. The half space defined by N' is used in subsequent calculations, in place of the half space defined by N.

Eventually, the question asked at step 72 will be answered in the negative and control will be directed to step 85, whereupon the view axis itself is added to the view angle structure.

Figure 8:
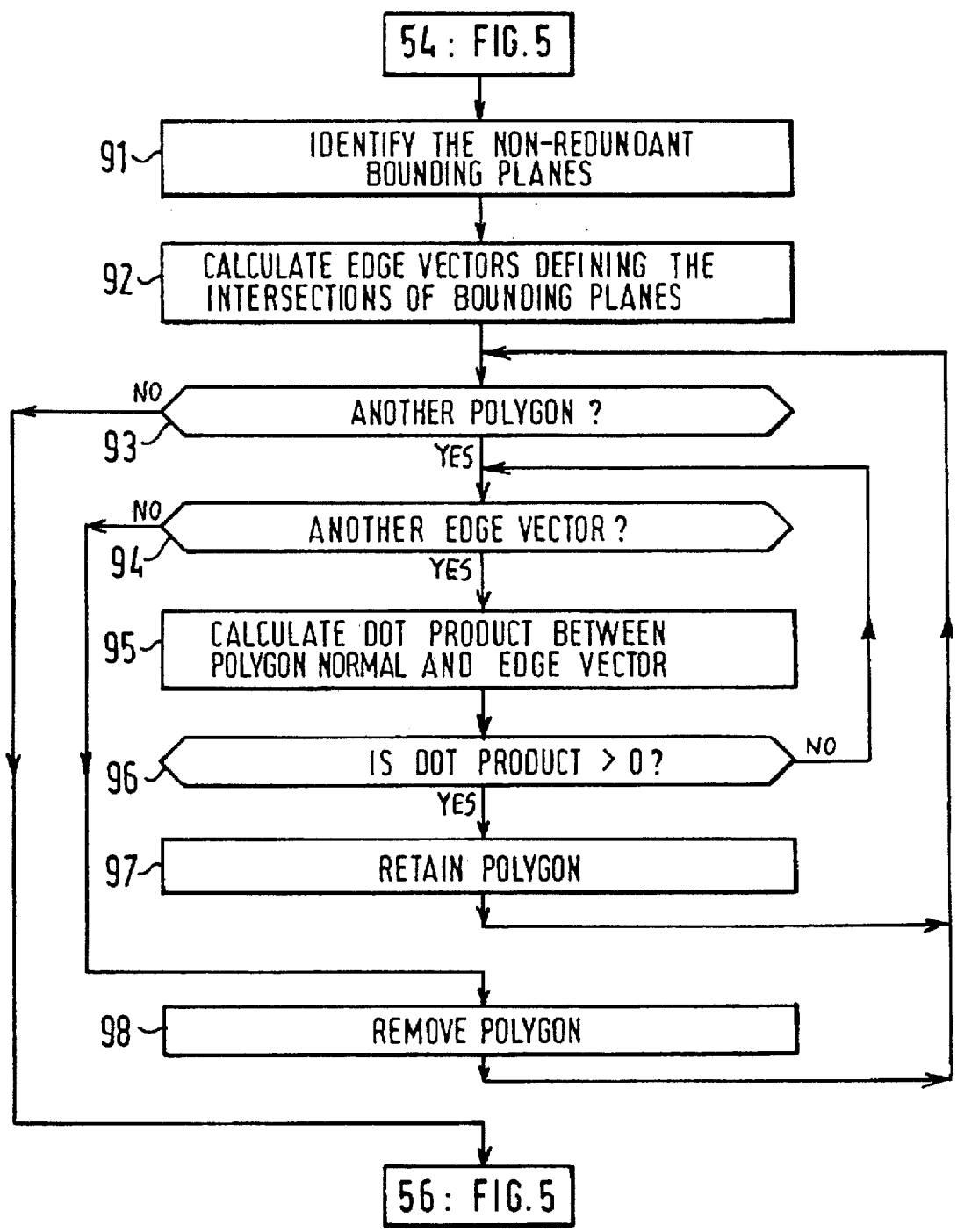
FIG. 8 details the procedures for the visibility test, identified in FIG. 5.

FIG. 8 details the removal of invisible polygons, identified as step 55 in FIG. 5. At step 91 the bounding planes, adjusted for field of view at step 54, are considered. In particular, the bounding planes considered are those which are required to bound directions associated with the notional viewing axis selected at step 53. Thus, this particular sub-set of bounding planes is referred to as the non-redundant bounding planes, in that they are non-redundant with respect to the currently selected notional viewing axis.

The non-redundant bounding planes, selected at step 91, intersect and at step 92 edge vectors defining these intersections are calculated. These vectors are used for subsequent processing and therefore data defining them is stored for future use.

At steps 93–98, all of the polygons are considered in turn, to determine whether, for the particular notional viewing axis under consideration, they are visible or not visible; it being noted that polygons which are not visible are removed in the same sense that they are not considered further in relation to producing a rendering order list for the selected notional viewing axis.

In particular, at step 93 a question is asked as to whether another polygon is available and on the first iteration this question will be answered in the affirmative. At step 94 a question is asked as to whether another edge vector (from the set calculated at step 92) is available and again, on the first iteration, this question will be answered in the affirmative.

At step 95, the dot product between the polygon unit normal vector and the edge vector, selected at step 94, is calculated.

At step 96, a question is asked as to whether the dot product calculated at step 95 is greater than zero. If the dot product is greater than zero, resulting in the question being answered in the affirmative, the polygon is retained at step 97 and control is returned to step 93, whereupon another polygon is selected.

If the question asked at step 96 is answered in the negative, it is possible that the polygon is invisible. However, the polygon is only invisible if the dot product formed with all of the edge vectors is not greater than zero. Thus, if the question asked at step 96 is answered in the negative, control is returned to step 94 and another edge vector is selected. Thus, the dot product is again calculated at step 95 for the next edge vector and the question is asked, at step 96, as to whether this dot product is greater than zero.

If none of the dot products is greater than zero, the question asked at step 94 will eventually be answered in the negative, resulting in the polygon being removed from further consideration, at step 98.

When all of the polygons have been considered, the question asked at step 93 will be answered in the negative, thereby directing control to step 56 (FIG. 5).

FIG. 9 shows in detail the step 56 (FIG. 5) for producing a preliminary list. At step 101 the polygon data, read from the shape file at step 18 (FIG. 1), is reconfigured into the form shown in FIG. 10. Each block of polygon data is given a label, so that it may be uniquely identified. These labels identify polygons which may be visible, the invisible polygons having been removed at step 55 (FIG. 5). In addition, each polygon is provided with additional space for the provision of pointers to identify attachment to a preliminary list or to "children" and/or "parents", as shown in FIG. 10. The function of these pointers will be described later with reference to FIG. 10.

Returning to FIG. 9, at step 102, a polygon is selected which has the furthest extent in the direction of the notional viewing axis. Thus, the preliminary list is produced by considering distances in the direction of the notional viewing axis, which provides a logical ordering of the polygons for subsequent processing to produce a rendering order list.

At step 103, the selected polygon is added to the end of the preliminary list and at step 104 a question is asked as to whether another polygon is available. When answered in the affirmative, control is returned to step 102, so that the next polygon of furthest extent may be selected.

Eventually, the question asked at step 104 will be answered in the negative and control will be returned to step 57.

Rendering order lists are produced by identifying a polygon which may be rendered in preference to all of the other polygons. The first polygons to be placed on the list are those which can be occluded by subsequent polygons, and therefore are to be rendered first. Thus, polygons which take priority in that they can occlude other polygons are the last to be placed on the list.

In some situations, it is not possible to produce a straightforward list (similar to the preliminary list) from the polygons that are available. It is possible, for example, for a first polygon to occlude a second polygon, for said second polygon to occlude a third polygon and for said third polygon to occlude the first polygon, thus presenting a situation in which there are mutual occlusions, in which it is impossible to say that any of the polygons takes priority over any of the other polygons. This situation is referred to herein as a cycle.

In the present embodiment, as will be described in more detail later, two procedures are adopted for the breaking of cycles. In a first procedure, cycles are broken by splitting a polygon into two "children", in such a way that a child may be placed on the rendering order list, another polygon may be placed on the list and then the other child is placed on the list and the mutual occlusion is avoided. The split polygon is referred to as the "parent" of the two children and for a child polygon the parent pointer identified in FIG. 10 is set to point to the label of the relevant parent polygon. Similarly, child pointers are provided, so that parent polygons may in turn point to polygon data for their particular children. In this embodiment, parents are always broken into two children, whereafter the placing of both children onto the rendering order list is treated as if the parent had been placed onto said list.

If it is not possible to break a cycle by splitting a polygon, a second procedure is tried wherein cycle breaking is effected by branching the rendering order list, such that said list will include decision points. When a decision point is reached, it is necessary to consider the actual position of the notional camera, in addition to its view direction, so that one of the available branches may be selected. Thus, in order to break cycles, the rendering order list may branch at various points, thereby adopting the form of a tree. It should be noted that each branch of the tree includes the same set of polygons, although some of them may be broken into children in different ways. However, the essential difference between the branches is the order of the polygons, which will differ depending upon the actual position of the notional camera.

After a branch and after a plurality of polygons have been listed (different orders for each branch), it is possible that the ordering of the two branches may become equivalent again. Thus, under such circumstances, it is only necessary to list the polygons once in one of the particular branches, with the other branch including a pointer to the branch which includes the full listing. In these circumstances, a list takes the form of a directed graph and all references herein to the final rendering order list should also include references to trees and to directed graphs.

Referring again to FIG. 10, each polygon data block includes a unique polygon label, added to the polygon data read from the shape file. In addition, the block includes: a parent pointer, pointing to a parent if that particular polygon is itself a child; an attachment pointer, pointing to a position in the preliminary list, either directly or via a parent polygon; and child pointers, identifying children if said polygon has been split into children.

Since the preliminary list is formed before any of the polygons are split, all of the polygons considered at this stage will have their attachment pointers set to a position in the preliminary list. However, polygons may be split in order to produce the rendering order list, and when a child is placed on the rendering order list, its accompanying child is also placed on said list, at an appropriate position, in preference to the parent.

Figure 11B:
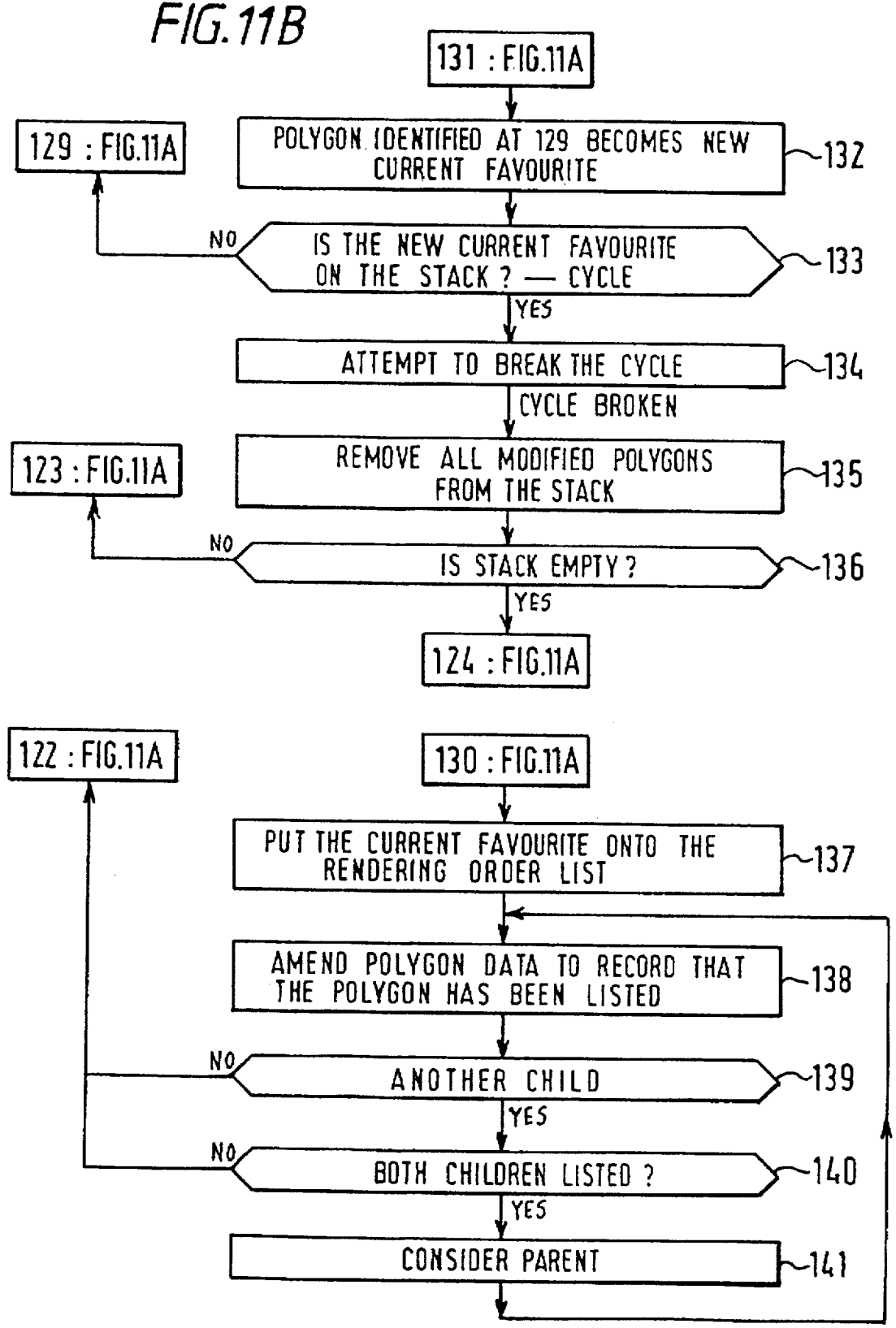

FIGS. 11A and 11B detail step 57, identified in FIG. 5. As previously stated, the polygons have, by this stage, already been placed in a preliminary listing and the final rendering order list is produced by selecting polygons from this preliminary list. In particular, a polygon is selected which, given its position in the preliminary list, is the most likely to be the next polygon placeable on the final rendering order list. This polygon is therefore identified as the "current favorite" and before it is placed on the final rendering order list, tests are made to confirm that this current favorite can be placed on the list. Testing is effected by comparing the current favorite with other polygons to identify a polygon which prevents the current favorite from being placed on the final rendering order list. Any polygon which is being compared with the current favorite is referred to as a candidate.

Before describing the actual tests which may be performed to determine whether a candidate does or does not prevent a current favorite from being placed on the rendering order list, a framework will be described by which suitable measures may be taken, in a logical way, if the current favorite cannot be placed on the rendering order list.

In particular, the current favorite is compared with a candidate to determine whether said candidate can prevent the favorite from being added to the list. On detecting that the candidate can prevent the favorite from being added to the list, an indication is made to the effect that a particular polygon has been selected as a current favorite but rejected from being placed on the rendering order list, whereafter another current favorite is selected.

Rejected current favorites are placed on a stack and the polygon which was previously the candidate and which successfully prevented the previous current favorite from being placed on the final rendering order list, or tree, is selected as the new current favourite. If this new current favorite is then successful in being placed on the final rendering order list the previous current favorite is popped off the stack and again tested against other candidates.

Thus, current favorites can be added to and removed from the stack, thereby creating an indication as to when a current favorite has been rejected, while making past current favorites available for reconsideration in preference to the remaining polygons on the preliminary list.

The stack also provides a mechanism for identifying the occurrence of cycles, in that, if an attempt is made to place a new current favorite on the stack which is already on the stack, it is clear that a cycle is present and measures must be taken to break the cycle.

As mentioned above, when attempts are made to break a cycle by splitting polygons, a particular polygon may be split into a pair of children. Moreover a polygon which is itself a child may again be split into a pair of children, and so on, although measures are included to ensure that children do not become too small.

Therefore the framework for placing polygons onto the stack is also capable of processing child polygons, thereby creating a rendering order list which may include children, in preference to their originating parents.

Referring now to FIG. 11A in detail, at step 121 an empty stack is created and at step 122 a question is asked as to whether the stack is empty. Clearly, on the first iteration this question will be answered in the affirmative and control will be directed to step 124.

At step 124 a question is asked as to whether all of the polygons have been processed and when answered in the affirmative, indicating that the final output rendering order list or tree has been completed, control is returned to step 58 of FIG. 5.

When the question asked at step 124 is answered in the negative, control is directed to step 125, whereupon the next polygon from the preliminary list is selected as the current favorite.

When polygons have been placed onto the stack, the question asked at step 122 will be answered in the negative, and at step 123, the top polygon from the stack will be taken, in preference to a polygon from the preliminary list, for identification as the next current favorite. Thereafter, control is again directed to step 126.

At step 126, a question is asked as to whether the current favorite has already been placed on the final rendering order list and if this question is answered in the affirmative, control is returned to step 122. When answered in the negative, control is directed to step 127.

At step 127, a question is asked as to whether the current favorite has children. If this question is answered in the affirmative, the lowest level child is identified and this is then set to be the current favorite. The lowest level child is that which itself does not have children, identified by descending through the "tree" structure of the polygons to identify what may be referred to as a "leaf".

If the question asked at step 127 is answered in the negative, control is directed to step 129, which also follows step 128. At step 129, measures are enacted to identify a polygon which the current favorite can occlude. If these measures are successful in identifying a polygon which the current favorite can occlude, information to this effect is generated at step 129, along with an indication as to the offending polygon. Alternatively, an indication is generated to the effect that there is no polygon which the current favorite can occlude.

Thus, at step 130 a question is asked as to whether there is a polygon which the current favorite can occlude and if answered in the negative, control is directed to step 137.

If the question asked at step 130 is answered in the affirmative, this means that the current favorite cannot be placed on the final rendering order list, the current favorite, which may now be referred to as an old current favorite, is placed onto the stack at step 131 and control is directed to step 132.

After an old current favorite has been placed on the stack at step 131, the polygon identified at step 129 (the successful candidate) becomes the new current favorite at step 132 (FIG. 11B).

At step 133 a question is asked as to whether the new current favorite is already on the stack, so as to determine whether a cycle is present. A cycle is present if this question is answered in the affirmative and when so answered, attempts are made to break the cycle at step 134.

If the question asked at step 133 is answered in the negative, control is returned to step 129 (FIG. 11A) and again measures are taken to try and identify a polygon which the newly selected current favorite can occlude.

Returning to FIG. 11B, after a cycle has been broken at step 134, some polygons may have been modified (for example, split or truncated) and these polygons are removed from the stack at step 135. The cycle breaking routine at 134 records the "lowest" modified polygon before returning control to step 135, meaning the modified polygon which has been on the stack longer than any other modified polygon. Step 135 then removes not only all modified polygons but also unmodified polygons which were added to the stack later than one of the polygons which has been modified. It is possible that all attempts to break the cycle will be unsuccessful and measures may have to be included to accept that a cycle is present and just ignore it. However, FIG. 11B will be described on the basis that all cycles can be broken, which should account for the majority of situations. After all modified polygons have been removed from the stack at step 135, a question is asked at step 136, as to whether the stack is empty. If the question asked at step 136 is answered in the negative, to the effect that the stack is not empty, control is returned to step 123, whereupon a current favorite is selected by popping the top polygon off the stack. Alternatively, if the question asked at step 136 is answered in the affirmative, to the effect that the stack is empty, control is returned to step 124, whereupon the question is again asked as to whether all of the polygons have been processed.

If the question asked at step 130 (FIG. 11A) is answered in the negative, the procedures called at step 129 were unable to identify a polygon which the current favourite could occlude. Thus, the current favourite is placed onto the rendering order list at step 137 (FIG. 11B). At step 138, the polygon data is amended, to record the fact that this polygon has been placed onto the rendering order list and at step 139 a question is asked as to whether another child is present. This question may be answered in the affirmative, if the current favourite was itself a child, otherwise the question will be answered in the negative, and control returned to step 122.

If the polygon placed on the rendering order list at step 137 was a child, a question is asked at step 140 as to whether the other child has been placed on the rendering order list. If this question is answered in the negative, control is again returned to step 122. Alternatively, if this question is answered in the affirmative, it is necessary to consider the data identifying the parent (step 141). Given that both children have now been placed onto the rendering order list, this situation is equivalent to placing the parent on the rendering order list therefore the parent is now deleted from further consideration.

After step 141, control is returned to step 138, whereupon the entry for the parent is amended to the effect that this parent has effectively been placed on the rendering order list. As previously stated, this parent could itself be a child, therefore, the question asked at step 139 is asked again and several iterations may be made around this loop, until control is returned to step 122.

FIGS. 12 details the procedures identified as step 129 in FIG. 11A, for identifying a polygon which the current favourite can occlude. At step 151, the next polygon is selected from the preliminary list in order to be tested as a candidate for being occluded by the current favourite.

At step 152, a question is asked as to whether there was another polygon to be taken at step 151, which will be answered in the negative if all of the polygons from the preliminary list have been processed. Thus, when the question asked at step 152 is answered in the negative, an indication to the effect that the current favourite cannot occlude any polygons is made at step 153 (because there are none left to occlude) and control is returned to step 130 of FIG. 11A. In such a case, the question asked at step 130 would be answered in the negative, resulting in control being directed to step 137 of FIG. 11B, which would in turn place the current favorite onto the rendering order list.

If step 151 is successful in obtaining a candidate polygon from the preliminary list, the question asked at step 152 will be answered in the affirmative and control will be directed to step 154.

At step 154, a question is asked as to whether the selected candidate is the same polygon as the current favorite, which is possible given that no checks have been made previously. If the candidate is the same polygon as the current favorite, resulting in the question asked at step 154 being answered in the affirmative, control is returned to step 151 and the next polygon from the preliminary list is selected as a new candidate, for testing as to whether it can be occluded by the current favorite.

If the question asked at step 154 is answered in the negative, to the effect that the candidate is a different polygon from the current favorite, tests may now be undertaken to determine whether the current favorite can occlude the candidate.

At step 155, extents are considered in the direction of the viewing axis. These extents were used to create the preliminary list, in that, polygons are placed onto the preliminary list in an order such that polygons having an extent furthest along the viewing axis are placed on the list in preference to polygons which have extents closer to the viewer when producing the preliminary list, polygons were sorted by comparing the vertex on each polygon which has the furthest extent in the viewing direction. This gives a preliminary list with a property which is exploited at step 155.

At step 155, the furthest extent of the candidate, that is to say the extent used for positioning the candidate in the preliminary list, is compared with the nearest extent of the current favorite. Thus, as far as the current favorite is concerned, it is not its furthest extent which is considered at step 155 (the extent used for placing it on the preliminary list) but its nearest extent.

At step 156, a question is asked as to whether the nearest extent of the current favorite is actually further away than the furthest extent of the candidate. If this question is answered in the affirmative, the current favorite cannot obscure the candidate.

An important feature of the preliminary list is that, if it can be determined, using the comparisons made at steps 155 and 156, that a favorite cannot occlude a candidate then, given the way in which the polygons were ordered on the preliminary list, it is not possible for the favorite to occlude any of the other polygons. This is because it was the furthest extents of all the polygons which were used for placing them in the preliminary list. Thus, if the furthest extent of the furthest polygon is nearer than the nearest extent of the favorite, all of the other polygons must have a furthest extent which is nearer than the nearest extent of the favorite. Therefore, the favorite cannot occlude any of these polygons. Consequently, it is possible to place the current favorite onto the rendering order list without making any further tests against any of the other polygons remaining on the preliminary list. The advantage of this procedure is that the amount of processing time required is significantly reduced in many situations, when the test made at step 156 is successful.

Another advantageous feature of this particular test is that it is not necessary to consider any individual children which may have been formed due to the candidate being split in order to break a cycle. The furthest extent of the parent will be equivalent to the furthest extent of the furthestmost child and, again, if this child polygon (of furthest extent) cannot be occluded by the current favorite, none of the other children can be occluded either. Thus, the test performed at steps 155 and 156 is particularly efficient given that, when successful, it is not necessary to perform any further tests on any of the remaining polygons.

Thus, the production of the preliminary list performs two important functions. Firstly, it provides a logical order for selecting favorites for placing on the rendering order list and for selecting candidates for comparing against said favorite. Secondly, when working in combination with step 155 and step 156, it greatly reduces the computational overhead required to place favorites onto the final rendering order list.

If the question asked at step 156 is unable to confirm that the current favorite cannot occlude the candidate, however, further measures must be taken before it is possible to return back to step 130 of FIG. 11A. Furthermore, for simplicity of implementation, it is desirable, when a candidate has been split into a plurality of children, to consider each leaf child individually. It will also be necessary to consider all of the remaining polygons on the preliminary list, until the question asked at step 152 is answered in the negative or until the extent test, performed at the steps 155 and 156, is successful.

At step 157, a question is asked as to whether the candidate has children. If this question is answered in the affirmative, the structure of the children is examined to identify leaf children, that is to say, children which are not themselves parents and have not themselves been split. A next leaf child is selected at step 158, and progress will be made, in relation to the structure of children, until all of the leaf children making up the root polygon selected from the preliminary list have been considered. In the step of creating children, a first child is generally further from the viewer than the second child, and so in step 158 the children are selected, at each level of the tree, in this order.

If the question asked at step 157 is answered in the negative, control is directed to step 159. Control is also directed to step 159 after step 158. At step 159, procedures are implemented to check if the current favorite can occlude the candidate, which may be a candidate selected from the preliminary list or a candidate which is a leaf child of a polygon selected from the preliminary list.

At step 160, a question is asked as to whether the current favorite can occlude the candidate and if this question is answered in the affirmative, an indication to this effect is made at step 161 and control is returned to step 130. The question asked at step 130 will then be answered in the affirmative, resulting in the current favorite being placed on the stack at step 131.

If the question asked at step 160 is answered in the negative, a question is asked at step 162 as to whether there is another leaf child, derived from the polygon selected from the preliminary list. If this question is answered in the affirmative, control is returned to step 158 and the next leaf child is selected for comparison against the current favorite at step 159. Thus, this loop is repeated until all of the leaf children for the selected polygon have been considered.

When all of the leaf children have been considered, the question asked at step 162 will be answered in the negative and control will be returned to step 151. At step 151, the next polygon from the preliminary list will be selected as the candidate and the procedure previously detailed will be repeated.

Thus, extents for the next polygon from the preliminary list will be compared at step 155 and again, if the question asked at step 156 is answered in the affirmative, it is then clear that none of the remaining polygons can be occluded by the current favorite. Thus, as soon as this occurs, it is no longer necessary to consider all of the remaining polygons as candidates, although such considerations will be made if tests performed at steps 155 and 156 remain unsuccessful.

FIG. 13 details the procedures identified at step 159 in FIG. 12, which check if the current favorite can occlude the candidate. At step 183, a question is asked as to whether any part of the candidate is behind the plane of the current favorite. The plane of the current favorite is defined by the unit normal vector of the current favorite and it is the plane which extends beyond the edges of the actual polygon itself, out to the boundaries of the world space under consideration. If there are no parts of the candidate which are behind this plane of the current favorite, it is not possible for the current favorite to occlude the candidate and the question asked at step 183 is answered in the negative.

When the question asked at step 183 is answered in the negative, control is directed to step 195, whereupon an indication is made to the effect that the current favorite cannot occlude the candidate and control is, thereafter, returned to step 160 of FIG. 12.

If the question asked at step 183 is answered in the affirmative, to the effect that there is a part of the candidate which is behind the plane of the current favorite, data representing this part, referred to as the "candidate fragment" is stored at step 184.

At step 185, a question is asked as to whether any part of the current favorite is in front of the plane of the candidate.

If no part of the current favourite is in front of the plane of the candidate, it is not possible for the current favourite to occlude the candidate. Thus, if the question asked at step 185 is answered in the negative, control is again directed to step 195, returning data to step 160 to the effect that the current favorite cannot occlude the candidate. However, if the question asked at step 185 is answered in the affirmative, it is possible, but not definite, that the current favorite could occlude the candidate.

At step 186, data defining the fragment of the current favorite which is in front of the plane of the candidate is stored, and subsequently, the fragments stored at steps 184 and 186 are compared with reference to the bounding planes.

Thus, at step 187, a bounding plane is selected. The plane has no absolute position, but has an orientation defined by its unit normal vector. The positive direction of the unit normal vector points towards the associated notional viewing axis, as described above, and positions of the polygon fragments are compared with reference to this positive direction. Specifically, at step 188 the nearest point of the current favorite fragment in the positive direction of the normal vector of the bounding plane is determined. Thereafter, at step 189, the furthest point of the candidate fragment in the positive direction of the normal vector of the same bounding plane is determined and at step 190 a question is asked as to whether the nearest point of the current favorite fragment is further away than the furthest point of the candidate fragment, for the plane under consideration.

If the nearest point on the current favorite fragment for the bounding plane is further in said direction than the furthest point of the candidate fragment, the current favorite cannot occlude the candidate, for a viewing direction parallel to the bounding plane. Thus, if the question asked at step 190 is answered in the affirmative, control is directed to step 195. If the question asked at step 190 is answered in the negative, a question is asked at step 191 as to whether there are more bounding planes to be considered. If this question is answered in the affirmative, control is returned to step 187, whereupon the next bounding plane is selected and the distance test is repeated at steps 188, 189 and 190. Thus, if for any of the bounding planes, a nearest point of the current favorite to said plane is further from said plane than the furthest point of the candidate to said plane, the question asked at step 190 is answered in the affirmative, the current favorite cannot occlude the candidate and control is directed to step 195.

It will be noted that a plurality of tests have been performed in a nested fashion and the order in which the tests are performed is arranged so as to achieve maximum mutual benefit. Thus, the tests performed at steps 183 and 185 may be considered as a first stage test in that, in addition to testing whether any part of the candidate is behind the plane of the favorite, data is obtained defining the candidate fragment. Similarly, when the question is asked at step 185 as to whether any part of the current favorite is in front of the plane of the candidate, data may be obtained defining the current favourite fragment.

Assuming the tests performed at steps 183 and 185 have been unsuccessful, in that the questions asked are both answered in the affirmative, a second stage test is performed. However, it should be noted that the second stage test is not performed on the original polygon data but is, in preference, performed on the data stored at steps 184 and 186.

Thus, in a situation where attempts are being made to determine whether a candidate polygon is in a position which prevents the current favorite being added to the rendering order list, a first test may identify a part of one of said polygons (or parts of both of said polygons) where the potential conflict may occur, thereby preventing the current favorite from being added to said list. Thereafter, a second stage test is performed, with reference exclusively to the particular part or parts of the offending polygons. Thus, although the first stage test may have been unsuccessful in deciding whether the current favorite could or could not be added to the list, it has provided information which allows a second stage test to be performed.

If the question asked at step 190 has been answered in the negative for all of the bounding planes, the question asked at step 191 will be answered in the negative and at this point it is not possible to say that the candidate is not occluded by the current favorite. Thus, at step 192 a further final check is made as to whether the current favorite can occlude the candidate.

At step 193, a question is asked as to whether the current favorite can occlude the candidate and, again, if answered in the negative, control is directed to step 195. If, however, after all of the tests have been performed, the question asked at step 193 is still answered in the affirmative, it must be assumed that the current favorite can occlude the candidate, resulting in information to this effect being returned to step 160.

Figure 14B:
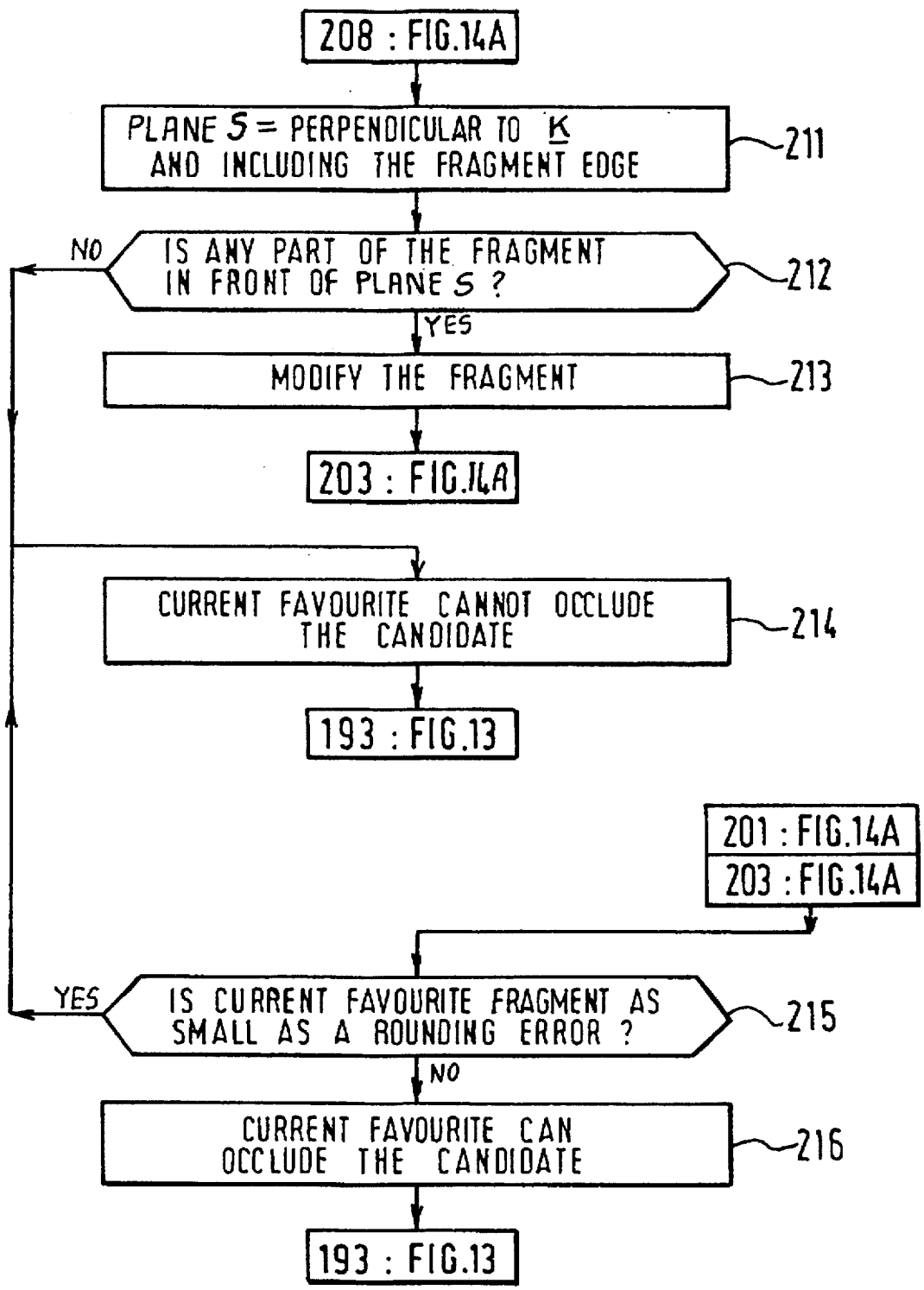

The procedure identified at 192, concerning a further check as to whether the current favorite can occlude the candidate, is detailed in FIGS. 14A and 14B.

As noted above, the determination of the current favorite fragment at step 185 of FIG. 13, is used to facilitate the check made at step 189. Furthermore, if it is determined that an occlusion may still exist after step 189, it is also known that this occlusion can only occur due to the part of the current favorite identified as the current favorite fragment. Thus, it is the current favorite fragment which may be occluding the candidate and the remainder of the current favorite cannot occlude any part of the candidate. Therefore, in the procedure of FIGS. 14A and 14B, it is only the current favorite fragment which needs to be considered further and if it can be shown that the current favorite fragment does not actually occlude the candidate, it is safe to place the whole of the current favorite onto the final rendering order list.

As described above, the test performed at step 190 (FIG. 13) has compared the nearest point of the current favorite fragment with the furthest point of the candidate fragment, in the direction of the normal vectors of the bounding planes. Thus, as far as this test is concerned, the actual region that has been considered is that in relation to the position of the bounding planes, which will tend to be a larger region than the actual area of the fragment itself. Thus, in considering a larger area than the actual fragment, it is possible that the test has identified the possibility of an occlusion when, in actual fact, an occlusion is not possible. Therefore, the procedure identified at step 192 checks as to whether the actual current favorite fragment causes an occlusion, rather than the region defined by the extents of the current favorite fragment.

FIGS. 14A and 14B show in detail the procedure used to determine whether the candidate fragments can actually occlude the current favorite. This procedure makes reference to the bounding edges, that is to say, the edges defined by the intersections of the bounding planes, defined by vectors, and to the edges of the fragment of the current favorite polygon, referred to as fragment edges. In particular the procedure selects an edge of the current favorite fragment and then considers this fragment against each bounding edge, whereafter a similar procedure is repeated for the other fragment edges.

At step 201 (FIG. 14A), a question is asked as to whether there is at least one bounding edge. This question will be answered in the negative if only one bounding plane is present. It is then likely that an obscuration can occur and control is directed to step 215 (FIG. 14B).

If there is at least one bounding edge, the question asked at step 201 is answered in the affirmative and a bounding edge is selected. At step 202, details of the current favorite fragment stored at step 186 (FIG. 13) are read.

At step 203, a question is asked as to whether the current favorite fragment has another edge. On the first iteration, this question will be answered in the affirmative and an edge of the fragment is selected for further tests. Thereafter, at step 204, a question is asked as to whether the length of the fragment edge is greater than zero. Thus, the question at step 204 identifies conditions in which an edge may appear to be present but in actual fact, it is not present because it has zero length. Thus, when the question asked at step 204 is answered in the negative, control is returned to step 203 and the next fragment edge is selected.

When the question asked at step 204 is answered in the affirmative, a question is asked at step 205 as to whether the plane of the fragment intersects the "view cone".

The view cone is here defined as the set of directions bounded by the bounding planes. A plane which intersects the view cone includes tangent vectors which are themselves allowable view directions. For a plane of this type, it is possible, from some view directions, to see its front face, while from other view directions the rear face of the plane is seen. Conversely, the plane of the fragment is considered not to intersect the view cone if it contains only directions which are outside the view cone. For such a polygon, either the front face is visible from all of the directions within the view cone, or the rear face is visible for all directions within the view cone.

If the question asked at step 205 is answered in the affirmative, to the effect that the plane of the current favorite fragment does intersect the view cone, a question is asked at step 206 as to whether the direction of the selected edge of the current favorite fragment lies within the view cone. That is to say, whether the vector defining the selected edge is equivalent to one of the allowable viewing directions defined by the view cone.

If the selected edge vector is an allowable viewing direction, the question asked at step 206 is answered in the affirmative and control is returned to step 203, whereupon another edge is selected. If the question asked at step 206 is answered in the negative or if the question asked at step 205 is answered in the negative, control is directed to step 207, whereupon a vector K is calculated.

The vector K is determined at step 207 by calculating the cross product of the vector defining the selected fragment edge with the vector defining selected bounding edge.

At step 208 a question is asked as to whether there is another bounding edge and if this question is answered in the affirmative, the next bounding edge is selected for further consideration.

At step 209, a question is asked as to whether the dot product formed between the previously calculated vector K and the bounding edge, newly selected at step 208, is negative.

If the dot product calculated at step 209 is negative, at step 210 a new value for K is calculated as the cross product of the fragment edge with the new bounding edge (selected at step 208). Alternatively, if the question asked at step 209 is answered in the negative, to the effect that the dot product calculated is larger than or equal to zero, the value of K previously calculated remains the same and control is returned to step 208, whereupon another bounding edge will be selected. Thus, steps 208 and 209 are repeated, for each of the bounding edges, and when a dot product calculated at step 209 is found to be negative, the stored vector K is re-calculated.

Eventually, the question asked at step 208 will be answered in the negative, to the effect that there are no more bounding edges, resulting in control being directed to step 211 of FIG. 14B.

At step 211, a plane S is calculated which is perpendicular to the vector K previously calculated and, furthermore, includes the vector defining the fragment edge.

At step 212 a question is asked as to whether any part of the fragment is in front of the plane S calculated at step 211. If this question is answered in the affirmative, the definition of the fragment under consideration is modified at step 213, to include only the part of the fragment which actually is in front of the plane S. Thereafter, control is returned to step 203, whereupon a further fragment edge may be considered.

If the question asked at step 212 is answered in the negative, to the effect that no part of the fragment is actually in front of the newly calculated plane S, it is not possible for the current favorite to occlude the candidate and control is directed to step 214, whereupon data to this effect is returned to step 193. Thus, under these conditions, a candidate which was previously considered as being possibly occluded has been shown to be not occluded after all by the current favorite, for any of the allowable view directions associated with the current notional view axis.

If, after considering all of the fragment edges, the question at step 212 continues to be answered in the affirmative, to the effect that there always is part of the fragment which is in front of the newly calculated plane S it would appear that the current favorite can occlude the candidate. Thus, the question asked at step 203 will be answered in the negative, resulting in control being directed to step 215.

A question is asked at step 215, which represents a further attempt to confirm that the current favorite cannot occlude the candidate. It is possible that, having modified the current favorite fragment, possibly several times at step 213, said current favorite fragment has become very small. Thus, at step 215 a question is asked as to whether the current favorite fragment has become as small as rounding errors present in the system. This being the case, it is not possible to say one way or the other whether there actually is a current favorite fragment or whether any representation of such a fragment present at this stage is due merely to arithmetical rounding errors. Thus, if the question asked at step 215 is answered in the affirmative, to the effect that the current favorite fragment remaining is as small as rounding errors present in the system, data is returned to step 214, to the effect that the current favorite cannot occlude the candidate.

However, if the modified current favorite fragment is larger than permissible rounding errors, the question asked at step 215 is answered in the negative and it must now be assumed that the current favorite can occlude the candidate. Thus data to this effect is specified at step 216 and control is returned to step 193 of FIG. 13.

Thus, the procedures detailed so far will identify a current favorite polygon for placing onto the rendering order list. They will then perform tests to determine whether it is appropriate for the current favorite to be placed on 'said list, by comparing it against candidate polygons which, as yet, have not been placed on said rendering order list. If the current favorite cannot be added to the list, because it can occlude a candidate, the current favorite is placed on a stack and the candidate which it can occlude is now taken as the next current favorite.

Thus, using the procedures described so far, it is possible to assemble a complete list, tree or directed graph, given that procedures are described which will always produce a result, one way or the other, as to whether a current favorite can be placed on the list or whether it cannot be placed on the list, because it can occlude a candidate.

The only situation in which these procedures are expected to fail is that identified at step 133 of FIG. 11B, in which a cycle has been identified. That is to say, a new current favorite is selected but this current favourite has been selected before, and has already been placed on the stack. Without the test being present at step 133, a continuous loop would be entered and no further progress would be made.

As identified at step 134 in FIG. 11B, procedures are included to break the cycle and in the present embodiment, it is assumed that all cycles can be broken by the measures provided at step 134.

FIGS. 15 to 20 detail a number of cycle breaking procedures identified at step 134 of FIG. 11B. A cycle can exist in which only two polygons are in the cycle, each being capable of occluding the other. The breaking of such a two-polygon cycle is relatively straightforward, given that a cycle can be broken by splitting one of the polygons about the plane of the other polygon. However, in the present embodiment, the procedure is optimized, with a view to reducing the number of subsequent splits which may be required. Cycles including more than two polygons require yet more sophisticated splitting procedures.

Therefore, at steps 221 and 222 of FIG. 15, a question is asked as to whether the cycle length is equal to two. If this question is answered in the negative, to the effect that more than two polygons are present in the cycle, control is directed to step 241 of FIG. 17.

Figure 16:
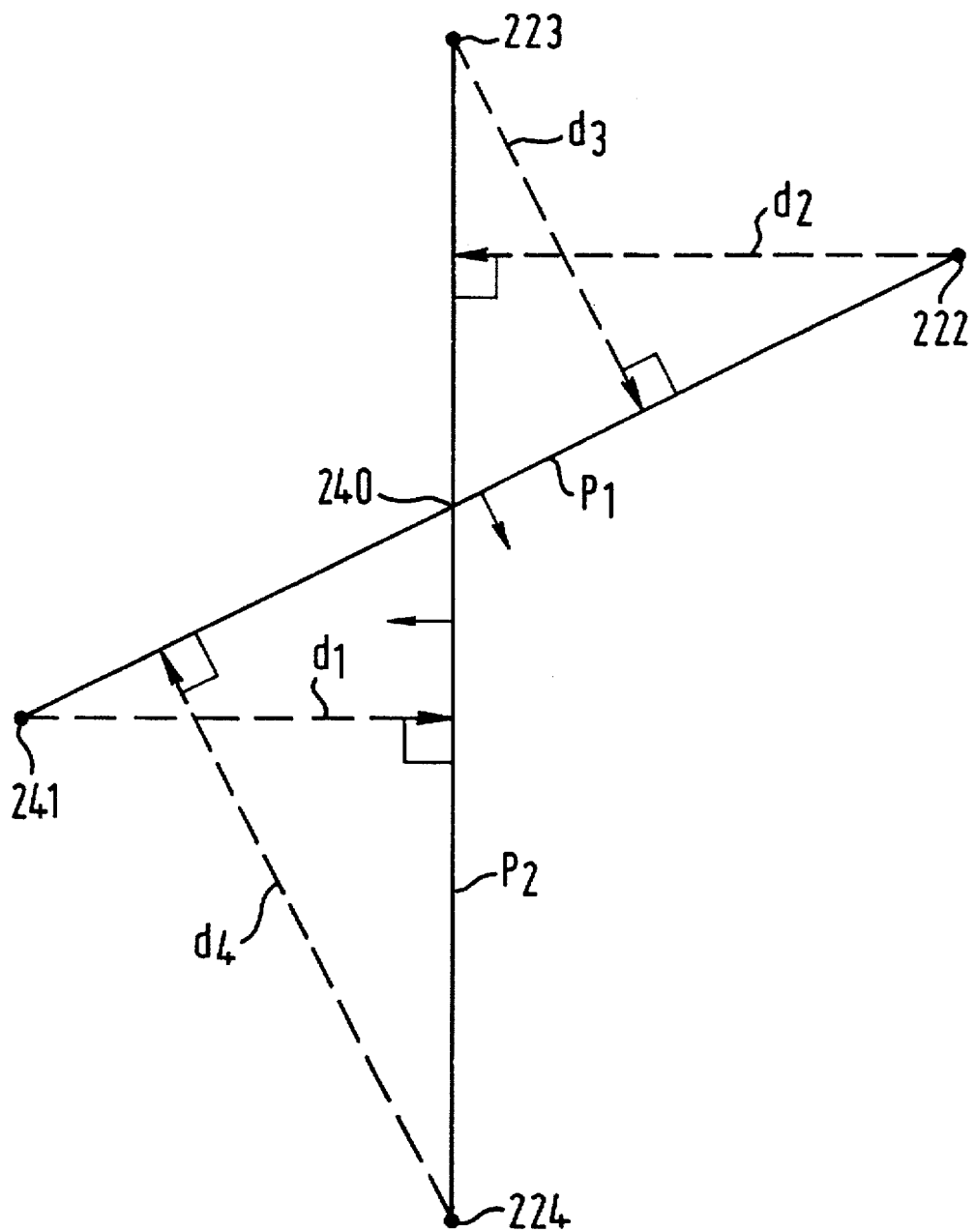
FIG. 16 illustrates the procedure performed in FIG. 15.

If the question asked at step 222 is answered in the affirmative, to the effect that only two polygons are present in the cycle, the arrangements of the polygons will be similar to that shown in FIG. 16. FIG. 16 is an end-on view of two polygons P1 and P2, wherein the planes of said polygons intersect along an axis 240. Thus, in FIG. 16, a two-dimensional view of the polygons has been taken looking down said axis 240.

Considering the plane of polygon P2, polygon P1 extends to one side of this plane, say the left side, by a perpendicular distance d1. Similarly, said polygon P1 also extends to the other side of the plane of polygon P2 by a distance d2. Furthermore, this situation may be considered the other way round, such that polygon P2 extends from the plane of polygon P1 by a distance d3 on one side of polygon P1 and extends similarly on the other side of the plane of polygon P1 by a distance d4. At step 223, these distances d1, d2, d3 and d4 are calculated and at step 224 a question is asked as to whether d2 is larger than d1. If d2 is not larger than d1, resulting in the question asked at step 224 being answered in the negative, a variable v1 is set equal to d2, at step 225. Alternatively, if the question is answered in the affirmative, to the effect that d2 is larger than d1, said variable v1 is set equal to d1 at step 226.

At step 227, a question is asked as to whether d4 is larger than d3 and if answered in the negative, to the effect that d4 is not larger than d3, a variable v2 is set equal to d4 at step 228. Alternatively, if the question is answered in the affirmative, to the effect that d4 is larger than d3, said variable v2 is set equal to d3 at step 229.

At step 230, a question is asked as to whether variable v2 is larger than variable v1. If answered in the affirmative, to the effect that v2 is larger than v1, polygon P2 is split at step 231. Alternatively, if the question asked at step 230 is answered in the negative, to the effect that variable v2 is not larger than variable v1, polygon P1 is split at step 232.

In each case, a polygon split occurs at the line of intersection 240. In the example shown in FIG. 16, d1 is larger than d3, resulting in variable v1 being found to be larger than variable v2, which would result in polygon P1 being split into two children; the split taking place along the axis 240. This split will result in the cycle being broken and thereafter control will be returned to step 135 of FIG. 11B.

Figure 17:
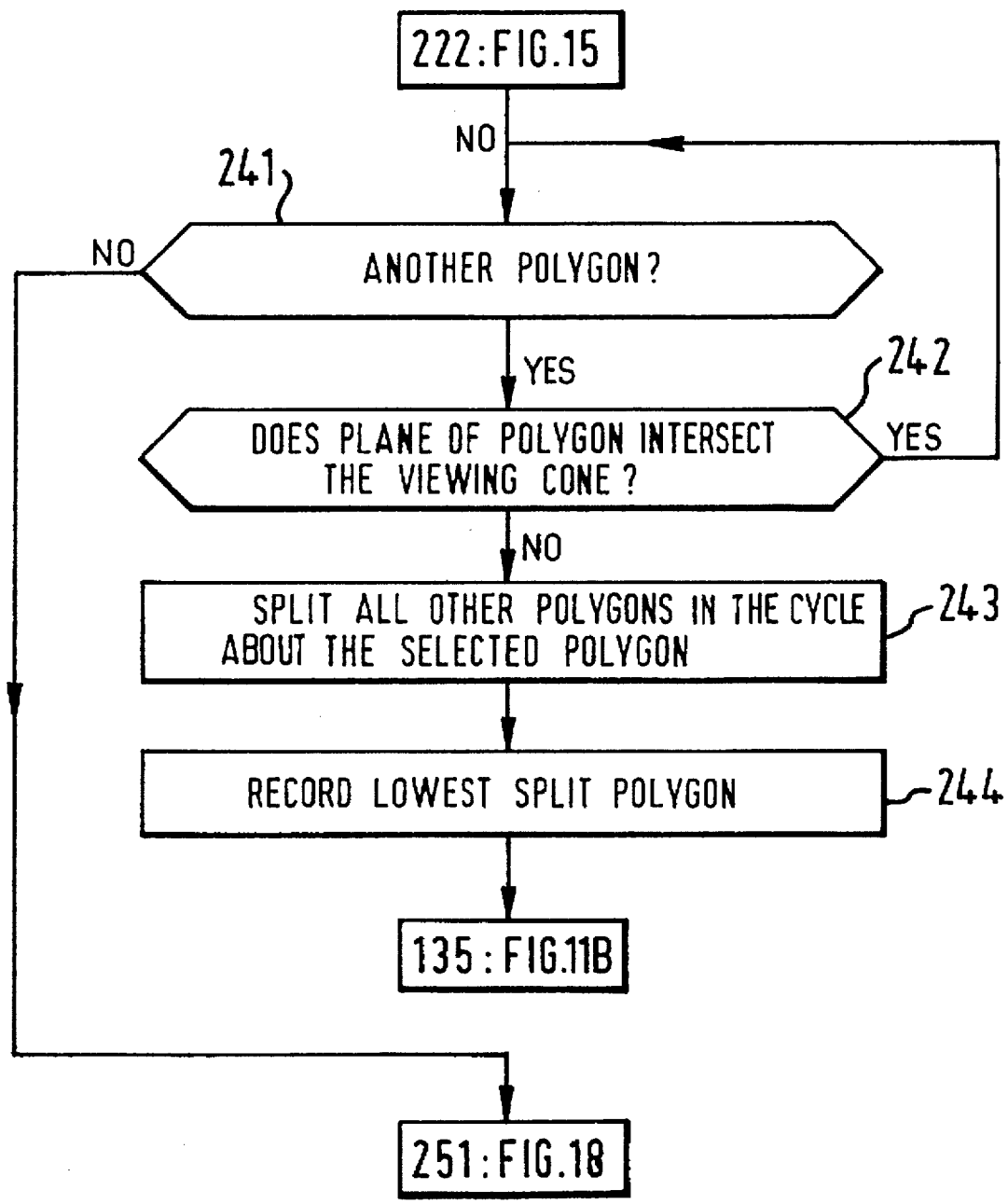
FIG. 17 details a procedure for splitting a cycle having more than two polygons, identified in FIG. 15.

If the question asked at step 222 is answered in the negative, to the effect that more than two polygons are present in the cycle, control is directed to step 241 of FIG. 17.

At step 241 a question is asked as to whether another polygon is present in the cycle and, on the first iteration, this question will be answered in the affirmative.

At step 242, a question is asked as to whether the plane of the polygon intersects the viewing cone. As previously stated, a plane does not intersect the viewing cone if, from all viewing directions associated with the current notional viewing axis, only one of its faces can be seen, this being its back face or its front face. Similarly, if the plane intersects the viewing cone, it is possible from some directions to see the front face while from other directions the back face is visible. Such a plane may be detected by changing the orientation of its unit normal vector. That is to say, the unit normal vector is reversed, such that, what was previously the back face becomes the front face. If the polygon does not intersect the viewing cone, the polygon effectively becomes invisible after the reversal, and therefore the invisibility test may be repeated to identify polygon planes of this type. However, if the plane of the intersects the viewing cone, reversing the polygon will make no difference, given that, in some orientations, it will still be visible.

The purpose of the procedure shown in FIG. 17 is to identify a polygon which does not intersect the viewing cone. This polygon will have viewing directions which may be considered as being on one side of the plane and viewing directions which may be considered as being on the other side of the plane. If such a polygon is present, this polygon can be used to identify a plane for splitting all of the other polygons, which will result in the cycle being broken. Thus, if the question asked at step 242, as to whether the plane selected at step 241 does intersect the viewing cone, is answered in the affirmative, such a plane is rejected and control is returned to step 241. If the question asked at step 242 is answered in the negative, to the effect that the selected polygon is present in a plane which does not intersect the viewing cone, all of the other polygons in the cycle are split about this plane of the selected polygon at step 243. At step 244, an identification of the lowest split polygon is recorded, allowing all of the modified (split) polygons to be removed from the stack when control is returned to step 135.

If the question asked at step 241 is answered in the negative, to the effect that all of the polygons have been considered and that all of said polygons intersect the viewing cone, it is not possible to use one of the available polygons to identify a plane for splitting all of the remaining polygons. Thus, if the question asked at step 241 is answered in the negative, control is directed to step 251 of FIG. 18.

Figure 18:
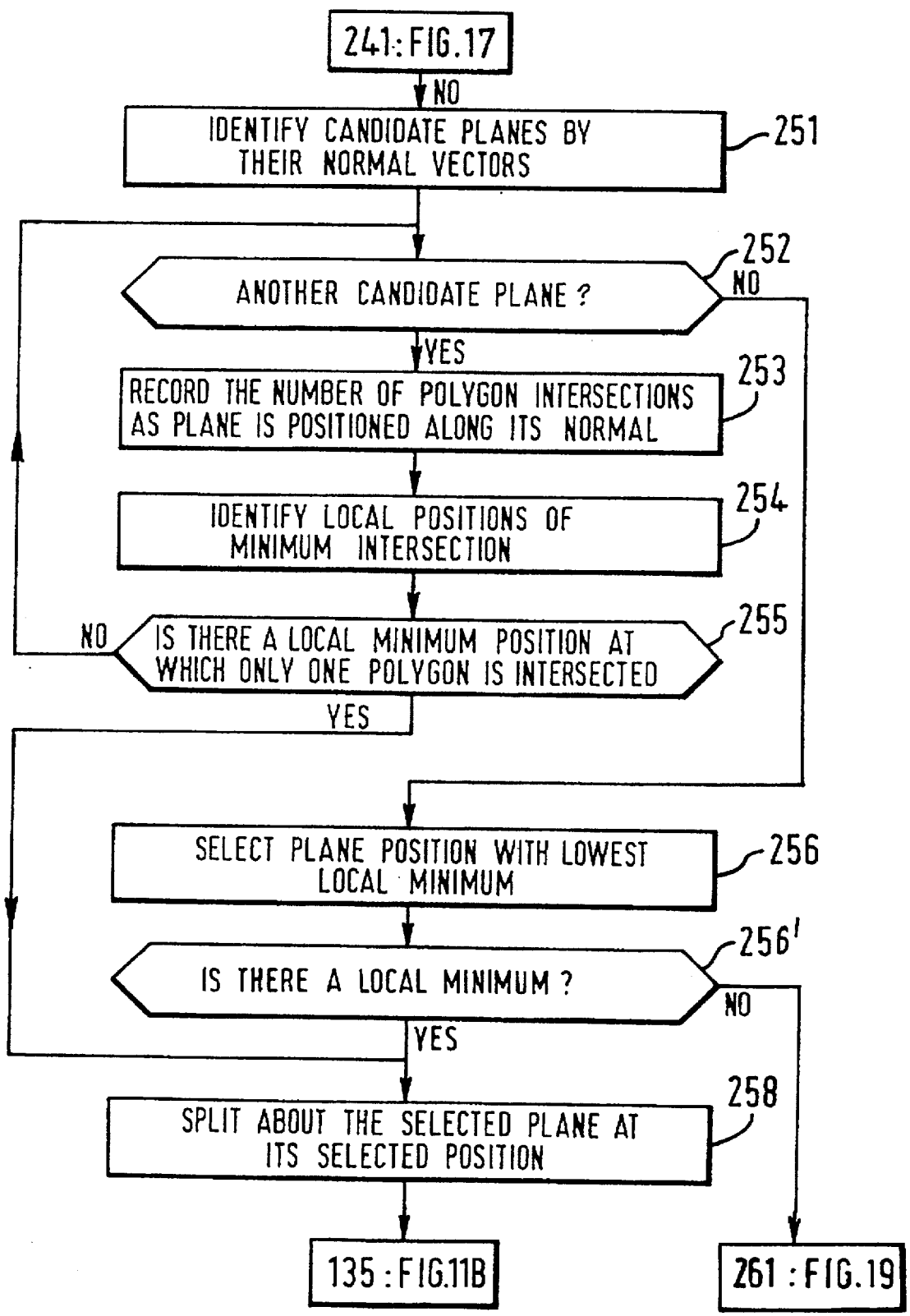
FIG. 18 details a further procedure for splitting a cycle having more than two polygons.

The procedure shown in FIG. 18 is similar to that shown in FIG. 17, in that polygons are split about a plane which does not intersect the viewing cone. During previous procedures, many planes will have been calculated, in particular, initial bounding planes and bounding planes determined after adjustment for field of view. Thus, if a polygon cannot be used to effect the splitting, because no polygon lies within the viewing cone, another plane may be selected which satisfies this requirement.

At step 251, candidate splitting planes are selected from the data previously generated to define a position of bounding planes. Suitable candidates are selected by making reference to their normal vectors. A plane will become a candidate plane if, after reversing its normal vector, it still fails the invisibility test and will be considered as visible from some of the valid view directions.

After a set of candidate planes has been collected, they are considered individually so as to identify a plane which may be suitable for effecting a polygon split.

The candidate planes selected by referring to previously calculated data are defined by their unit normal vectors. Thus, each unit normal vector will actually define a family of parallel planes, each having the same orientation but not defined in terms of their absolute position. Thus, from this available set of planes it is possible to define an actual splitting plane by moving a notional plane along its normal vector to a desired absolute position. At step 252, a question is asked as to whether another candidate plane is available, and when answered in the affirmative, a first candidate plane is selected. As previously stated, at this stage, the candidate plane will not have an absolute position and the candidate plane is moved along its normal vector. As a candidate plane is moved along its normal vector, a record is made of the number of polygon intersections which occur (step 253).

At step 254, identification is made of the positions of local minima in the number of polygon intersections. The data defining the position of intersections may be regarded as a histogram and a local minimum is a position within the histogram for which moving the plane in either direction along its normal will result in the number of intersections increasing. In the embodiments, these local minimum positions are identified as potential positions for the candidate splitting plane.

An ideal splitting plane will split only one polygon and if such a plane can be identified this will be taken immediately as the preferred splitting plane. Thus, a question is asked at step 255 as to whether there is a local minimum position for the candidate plane at which only one polygon is intersected. If this question is answered in the affirmative, control is directed to step 258, in which the split is effected about the selected plane, thereby breaking the cycle and allowing the procedure to return to step 135 of FIG. 11B. If the question asked at step 255 is answered in the negative, to the effect that all of the local minima intersect more than one polygon, control is returned to step 252 and another candidate plane is selected.

Thus, steps 252 to 255 are repeated for each of the candidate planes until the question asked at step 255 is answered in the affirmative, resulting in the split taking place, or the question asked at step 252 is answered in the negative.

When the question asked at step 252 is answered in the negative, the local minima for each of the candidate planes are compared and the plane which has the lowest local minimum is selected (step 256). It may be noted that if the lowest local minimum is equal to zero, rounding errors have caused a cycle to be detected where none exists. In this case, there is nothing to split and control should be returned to step 135 of FIG. 11B.

Assuming the lowest local minimum is not equal to zero, control is directed to step 258 and splits are made about the selected plane, whereafter, having broken the cycle, control is directed to step 135 (FIG. 11B).

Figure 19:
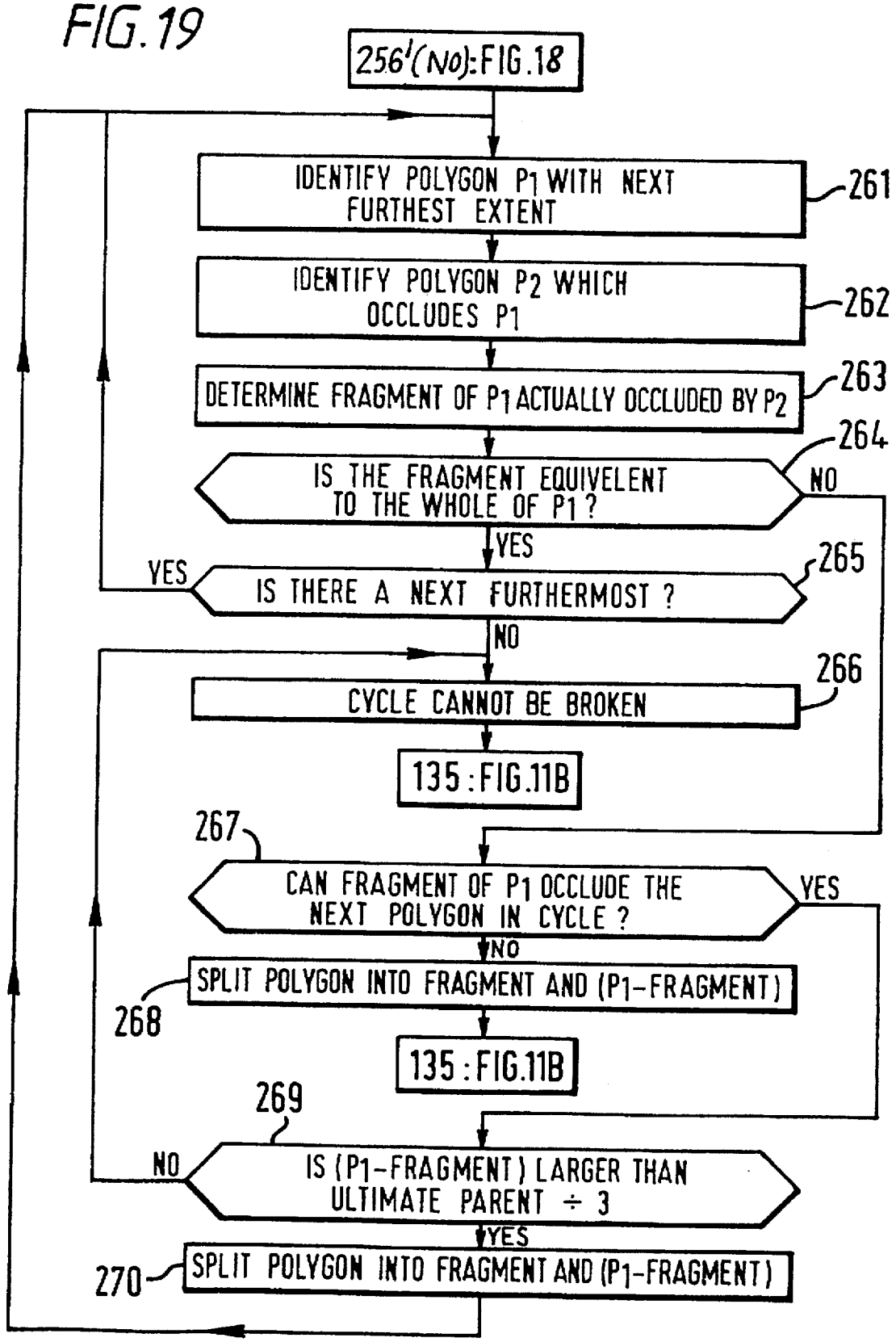
FIG. 19 details a further procedure for splitting a cycle having more than two polygons.

A step 256' asks whether any local minimum was found at all, and if this is answered in the negative, an alternative procedure to attempt to break the cycle may be effected, as detailed in FIG. 19.

Referring to FIG. 19, at step 261 a polygon is identified as P1, which is the polygon having the furthest extent in the direction of the notional viewing axis. Thus, referring to the polygons present in the cycle, P1 will be the polygon which was placed on the preliminary list prior to any of the other polygons in the cycle. A diagrammatic representation of polygon P1 is shown in FIG. 20.

At step 262, a polygon P2 is identified, which is the polygon which can occlude polygon P1. This polygon is also identified in FIG. 20.

At step 263, the fragment of P1 actually occluded by polygon P2 is identified. Then, at step 264, a question is asked as to whether the polygon fragment identified at step 263 is equivalent to the whole of P1. That is to say, whether the whole of P1 is actually occluded by polygon P2. If this question is answered in the affirmative, control is directed to step 265, at which a question is asked as to whether there is a next furthermost polygon. When this question is answered in the affirmative, control is returned to step 261 and the next polygon of furthest extent is selected and identified as the new P1.

It is highly unlikely that the whole of each polygon will be occluded by another polygon but in this unlikely event, the question asked at step 265 will be answered in the negative, resulting in control being directed to step 266, at which an indication is made to the effect that the cycle cannot be broken and control is returned to step 135.

If the question asked at step 264 is answered in the negative, to the effect that the fragment is smaller than the whole of P1, control is directed to step 267, at which a question is asked as to whether the fragment of P1, occluded by P2, occludes the next polygon in the cycle.

In the example shown in FIG. 20, the fragment of P1 occluded by P2 does not itself occlude P3. Thus, in this situation, the question asked at step 267 would be answered in the negative, resulting in polygon P1 being split into its fragment and remainder (step 268), thereby breaking the cycle and returning control to step 135.

If the question asked at step 267 is answered in the affirmative, to the effect that the fragment occluded by P2 also occludes P3, a splitting of polygon P1 into its fragment and remainder will not break the cycle. However, it is possible that such splitting will facilitate other measures to break the cycle. Therefore, assuming the split does not form a very small fragment or remainder, it is worth doing.

Thus, if the question at step 267 is answered in the affirmative, control is directed to step 269, at which a question is asked as to whether the area of the remainder polygon, that is P1 minus the fragment, is larger than the area of the ultimate parent polygon divided by three. The ultimate parent polygon is the originating polygon present in the preliminary list, being a polygon which itself is not a child.

If the question asked at step 269 is answered in the affirmative, to the effect that the remainder is larger than the ultimate parent area divided by three, the split is made at step 270 and control is returned to step 261, at which another polygon P1 is selected.

If a question asked at step 269 is answered in the negative, to the effect that the remainder is small, the split is judged unlikely to achieve anything. In such a case control is returned to step 266, and an acknowledgement is made to the effect that the cycle cannot be broken, whereafter control is returned to step 135.

Summary of an Interactive Three-Dimensional Graphic System

Figure 21:
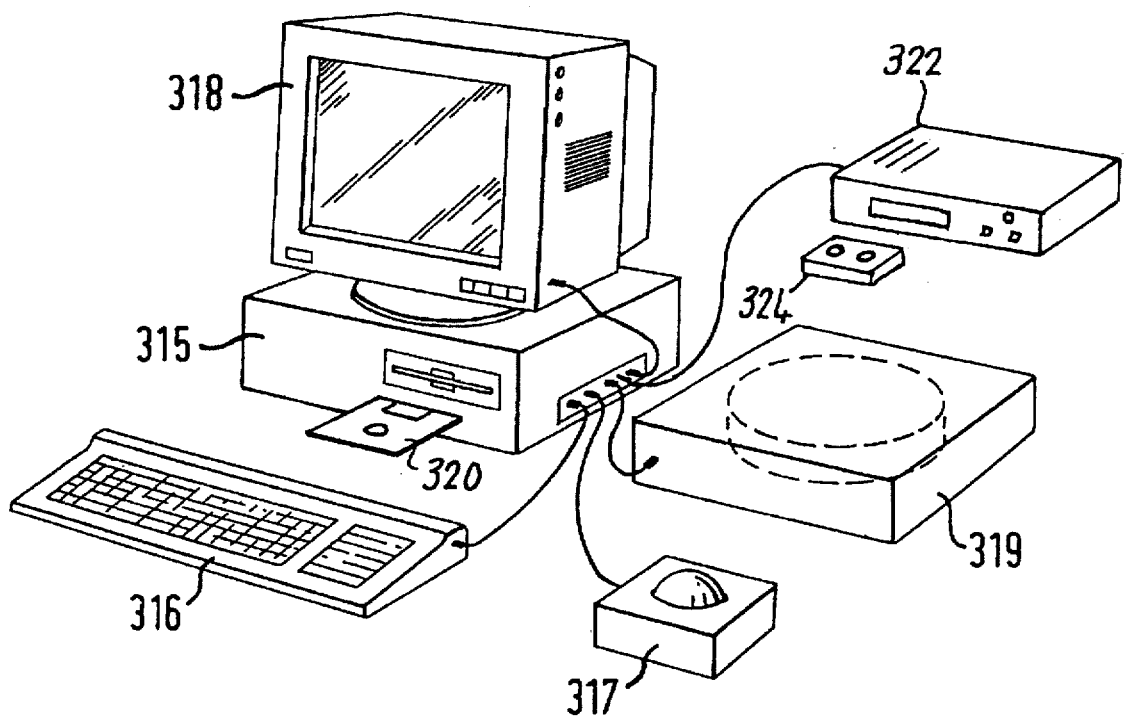
FIGS. 21 and 22 illustrate a system for providing an interactive three-dimensional graphics environment.

FIG. 21 shows an interactive three-dimensional graphics system in which a processor 315 is arranged to write data to and read data from an internal memory device. Data stored in said memory device defines three-dimensional image data, two-dimensional image data and instructions to the processor.

The processor 315 receives input data from input devices, consisting of a manually operable keyboard 316 and a position sensitive device, such as a mouse, a trackerball 317 or a digitising tablet and stylus etc.

Two-dimensional images are displayed on a visual display unit (VDU) 318, which receives output image data at video rate by raster-scanning a frame buffer, often provided with proprietary display units. The visual display unit 318 has a definition of, for example, 1,000 lines with 1,000 pixels on each line, requiring a frame buffer with 1,000,000 pixel locations. For the bulk transfer of program data and image data, a mass storage device 319 is provided, such as a hard magnetic disc, optical disc or tape drive etc.

Removable storage devices such as a floppy disk 320, CD-ROM etc. may also be used for storage of image data and/or processor instructions. In addition to the display of images on the VDU 318, image signals can be output from the frame buffer or processor 315 for transmission or storage. A video cassette recorder 322, for example, is connected for recording the generated images on a removable video cassette 324.

Figure 22:
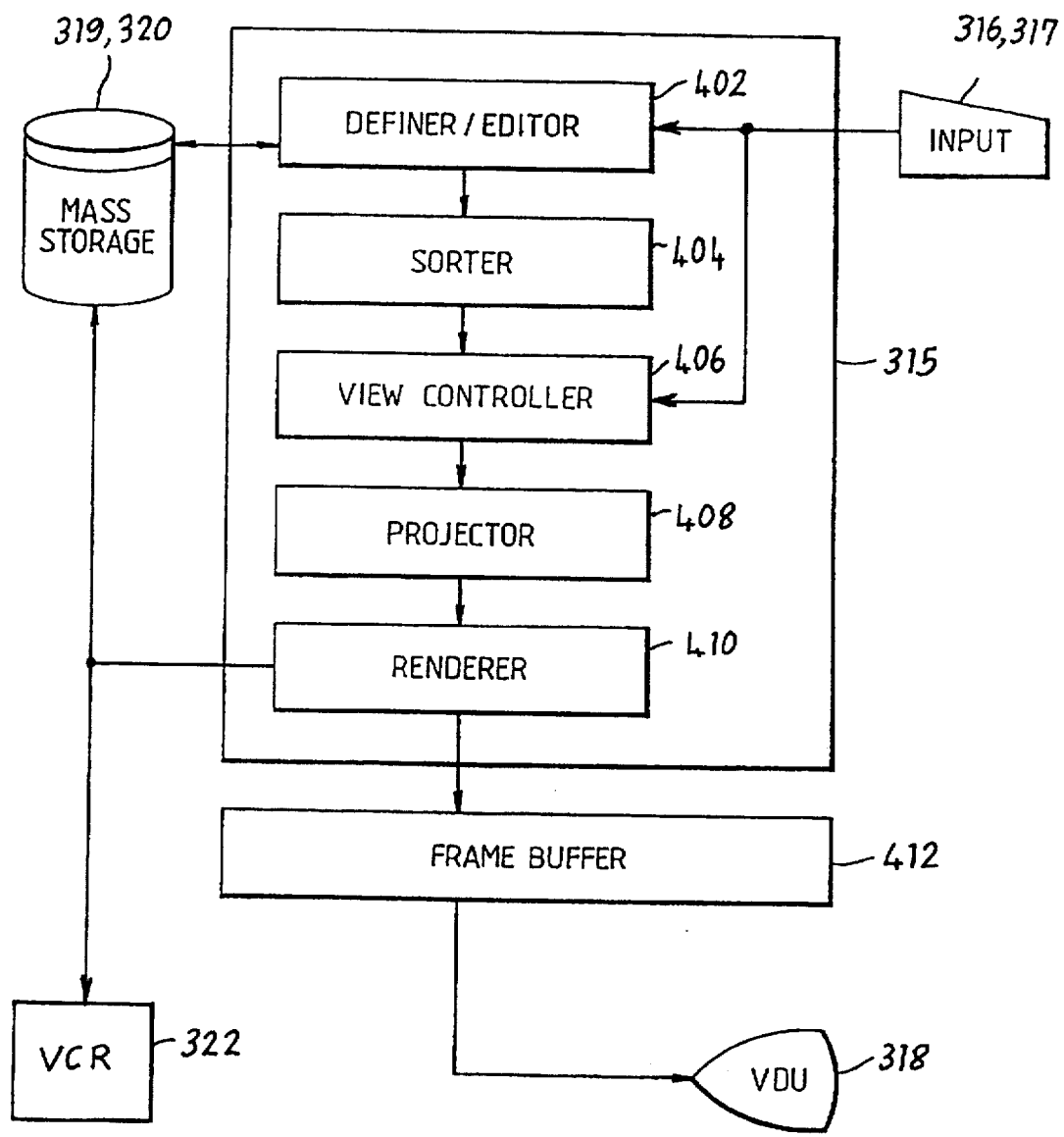

Referring to FIG. 22 the general method of operation of the system will now be described. The processor 315 performs a number of different operations at different times, executing corresponding stored programs within the internal memory and therefore comprises (together with the internal memory) means 402–410 for performing such operations; these means are illustratively shown in FIG. 22 as separate although in the described embodiment all are implemented by the processor 315. It will of course be understood, however, that separate processors or dedicated logic circuits, operatively interconnected, could be provided to execute each function.

The system may thus be viewed as comprising, firstly, a definer or editor 402 arranged to define the shape of a three dimensional object to be animated and likewise, optionally, to edit the object. Typically, the definer 402 is connected to the mass storage devices 319, 320 to enable an object, once defined, to be stored for subsequent use, and the editor 402 is connected to the input devices 316 and 317 to enable an operator to alter the three dimensional object. However other input and output devices (for example, other computers connected via a network) may be provided in addition to, or instead of the input devices 316, 317 and mass storage devices 319, 320. As will be described in greater detail below, in this embodiment the data defining a three dimensional object is data representing vertices of a plurality of polygonal surfaces (typically, contiguous polygonal surfaces) making up the object. Defining only the vertices enables a relatively compact representation of a surface which may include a substantial number of picture elements, as well as being independent of the resolution in which the images of the object are reproduced.

The processor 315 further comprises means 404 for performing an initial operation of sorting the surfaces or regions of the object into an order determining the order in which they will be drawn (ie rendered into the frame buffer 412) so as to draw last those regions which will occlude others. The sorter 404 accordingly reads the object data defined by the definer 402 and generates a corresponding sorted list of regions for subsequent use, prior to drawing and all subsequent animation or movement of the object.

The appearance of the object on a two dimensional screen such as the display unit 318, and consequently the image data stored in the frame buffer 412, is dependent upon the direction from which the object is to be viewed; it may also be dependent upon a defined distance between the object an a notional view point corresponding to the plane of the display unit 318. The processor 315 therefore includes a view control means 406 enabling an operator to define a view direction or direction and distance (for example, by defining the coordinates of a view point and/or a direction), via the input device 317. Rather than defining individual view points one at a time, the input means 317 may be employed to define a trajectory of successive view points or viewing directions, for example by specifying a direction of movement and speed, so that successively rendered images are animated. The data defining the view direction and/or distance defines a relative distance and direction between the object and the notional plane of the display unit 318 (notional view point); where only a single object is to be displayed, it may allow data to define either the position and orientation of the object or of the screen, since what matters is the relative inclination between the two. On the other hand, where multiple objects at mutually defined positions are to be drawn, the view controller 406 preferably is capable of defining either the view position or a new position for one object at a time, so that either one object may be moved independently or the view may be moved relative to all objects.

Having defined the relative orientation of the object, relative to the viewing plane corresponding to the display unit 318, the processor 315 has the necessary data to enable projection means 408 to perform a projection of the or each three dimensional object (region by region) into the two dimensional viewing plane. Each two dimensional viewing plane region thus projected by the projector 408 is then rendered, in the order previously defined by the sorter 404, by a renderer 410 which fills the region (i.e., allocates a predetermined color value to each pixel location in the frame buffer 412 which lies within the region). Only regions which face outwardly or the object ("forward facing") need to be rendered. The renderer 410 is therefore arranged to test each region to determine the direction which, in the projected plane, it is facing. Having rendered all regions and written the corresponding image data into the frame buffer 318, the view controller 406 updates the view point, if necessary, and, if it has changed, the projector 408 and renderer 410 re-execute their respective processes as above.

The means 402-410 provided in the system of FIGS. 21 and 22 therefore may be seen to fall into two groups: those which need to operate each time a new view of an object is to be displayed (406, 408 and 410), and other means (402, 404) which can operate without reference to the actual views required. Those skilled in the art will appreciate that within these groupings, the functional blocks can be re-grouped and implemented in a variety of ways.

The operational procedures for the processor 315, during its interactive process stages 406-410 will now be described briefly, by way of background. The view controller 406 defines, under control, a viewing transformation, which relates the view point to the "world" coordinate system in which the vertices of objects are defined. Object culling is then performed by determining, after local transformation and viewing transformation, the extent to which an object can actually be seen. Extents are defined for the object in each dimension, that is to say, maximum and minimum values are determined for the object of each of the X, Y and Z dimensions. This process is facilitated by defining a cuboid bounding box of planes of constant X, Y and Z extent. The bounding box is transformed into viewing space and the position of the transformed bounding box is considered; to determine whether it is totally within the viewable space, totally outside the viewable space or intersecting the viewable space.

If an object is totally outside the viewable space, no further processing is performed on the polygons defining such an object, thereby making significant savings in terms of processing time. For objects totally within the viewable space, processing continues on these polygons and no saving is made. However, the processing overhead for transforming the bounding box is quite modest. For objects which are partially within the viewable space and partially outside the viewable space, data defining the planes of intersection is stored to assist in the clipping of polygons.

A clock is present which effectively gives a unique time stamp to each iteration. This stamp is then applied each time light sources or objects are moved. Thus, if it can be seen that on the present iteration no changes have occurred to the position or orientation of the lighting, or to the position of polygons from the last iteration, lighting calculations calculated on the previous iteration are used again.

A local transformation transforms an object from its own object space into world space. Lighting calculations are performed by effecting an inverse transformation upon the position of light sources, thereby transforming said light sources into object space. Thereafter, lighting calculations are performed in object space and the object is then transformed directly from its own object space into viewing space, using a concatenated matrix.

Thus, the concatenated local and view transforms are implemented to transform the object geometry into viewing space.

Polygons which do not lie within the viewing space are clipped and, in order to perform this process, the additional information generated from object culling is employed.

Three-dimensional image data is converted into two-dimensional image data and back face culling is performed. Scan conversion is then effected and during this process, account is taken of the restricted size of the frame buffer which, typically, has only 8 bits per pixel location. Thereafter, a two-dimensional video image is produced by raster-scanning the frame buffer at video rate.

While the techniques described above have been implemented in the pre-processing stages of 3-D image generation, it will be apparent to the skilled reader that at least some of these techniques can be employed in interactive stages. For example, electronic graphics systems are known in which polygons are sorted into a rendering order list specific to the interactively-determined view position, without pre-processing. Accordingly, the invention is not limited to the embodiments described herein.

I claim:

1. In an interactive graphic system having a processor for processing signals defining objects in a three-dimensional space, each object being comprised of a plurality of surface primitives, a method of processing the signals to determine a rendering order in which the surface primitives may be rendered to effect hidden surface removal, the method comprising the steps of:

processing the signals to determine a first rendering order, effective for the primitives for a first range of values of a viewing parameter, wherein a cycle in which a first primitive and a second primitive which cannot be ordered for the first range is detected and at least one of the first primitive and the second primitive is split into smaller primitives to break the cycle;

processing the signals to determine at least one further rendering order, effective for the primitives for a second range of values of the viewing parameter; and subsequently defining interactively an actual value of the viewing parameter, in accordance with which a two dimensional image of the objects is to be rendered; and selecting one of the previously determined rendering orders as a selected rendering order in dependence upon the actual value of the viewing parameter, wherein said step of processing the signals to determine a first rendering order includes (i) identifying a cycle having exactly two primitives therein, each primitive having extents and lying within a plane, and (ii) breaking the cycle by splitting whichever primitive of the two is judged to minimize a probability of further cycles remaining, a given one of the primitives being selected for splitting by making reference to the extents of the given primitive with respect to the plane of the other primitive.

2. A method according to claim 1, wherein both the first rendering order and the further rendering order comprise a rendering order list, tree or directed graph.

3. A method according to claim 1, wherein the viewing parameter is a viewing direction.

4. A method according to claim 1, further comprising the step of rendering the surface primitives according to the selected rendering order to produce rendered image data.

5. A method according to claim 4, further comprising the step of generating a signal conveying the rendered image data.

6. A method according to claim 5, further comprising the step of recording the signal.

7. A method according to claim 4, further comprising the step of processing the rendered image data in order to generate a display of an image of the object.

8. A method according to claim 1, further comprising the step of generating a signal conveying the rendering order and the further rendering order.

9. A method according to claim 8, further comprising the step of recording the signal.

10. A method according to claim 1, further comprising the step of generating a signal conveying the selected rendering order.

11. In an interactive graphic system having a processor for processing signals defining objects in a three-dimensional space, each object being comprised of a plurality of surface primitives, a method of processing the signals to determine a rendering order in which the surface primitives may be rendered to effect hidden surface removal, the method comprising the steps of:

processing the signals to determine a first rendering order, effective for the primitives for a first range of values of the viewing parameter, wherein a cycle in which a first primitive and a second primitive which cannot be ordered for the first range is detected and at least one of the first primitive and the second primitive is split into smaller primitives to break the cycle;

processing the signals to determine at least one further rendering order, effective for the primitives for a second range of values of the viewing parameter;

subsequently defining interactively an actual value of the viewing parameter in accordance with which a two-dimensional image of the object is to be rendered; and selecting one of the previously determined rendering orders as a selected rendering order in dependence upon the actual value of the viewing parameter, wherein the step of processing the signals to determine the first rendering order includes (i) identifying a cycle having three or more primitives therein, and (ii) breaking the cycle by splitting a primitive along a boundary between a fragment which can be occluded by another primitive and a complementary fragment which cannot be occluded by said other primitive for the first range of values of the viewing parameter, the primitive being split if the fragment cannot occlude a third primitive which is also a primitive of the cycle.

12. A method according to claim 11, wherein both the first rendering order and the further rendering order comprise a rendering order list, tree or directed graph.

13. A method according to claim 11, wherein the viewing parameter is a viewing direction.

14. A method according to claim 11, further comprising the step of rendering the surface primitives according to the selected rendering order to produce rendered image data.

15. A method according to claim 14, further comprising the step of generating a signal conveying the rendered image data.

16. A method according to claim 15, further comprising the step of recording the signal.

17. A method according to claim 14, further comprising the step of processing the rendered image data in order to generate a display of an image of the objects.

18. A method according to claim 11, further comprising the step of generating a signal conveying the rendering order and the further rendering order.

19. A method according to claim 18, further comprising the step of recording the signal.

20. A method according to claim 11, further comprising the step of generating a signal conveying the selected rendering order.

21. An interactive graphics apparatus for processing signals defining objects in a three-dimensional space, each object being comprised of a plurality of surface primitives, so as to determine a rendering order in which the surface primitives may be rendered to effect hidden surface removal, comprising:

processing means for processing the signals to determine (i) a first rendering order, effective for the primitives for a first range of values of a viewing parameter, wherein a cycle in which a first primitive and a second primitive which cannot be ordered for the first range is detected and at least one of the first primitive and the second primitive is split into smaller primitives to break the cycle, and (ii) at least one further rendering order, effective for the primitives for a second range of values of the viewing parameter;

viewing parameter definition means for interactively defining an actual value of the viewing parameter in accordance with which a two-dimensional image of the objects is to be rendered; and selecting means for selecting one of the previously determined rendering orders as a selected rendering order in dependence upon the actual value of the viewing parameter, wherein said processing means processes the signals to determine the first rendering order by: (i) identifying a cycle having exactly two primitives therein, wherein each primitive has extents and lies within a plane, and (ii) splitting a primitive of the two which is judged to minimize a probability of further cycles remaining, said processing means selecting a given one of the primitives for splitting by making reference to the extents of the given primitive with respect to the plane of the other primitive.

22. An apparatus according to claim 21, wherein said processing means determines the first rendering order and the further rendering order as a rendering order list, tree or directed graph.

23. An apparatus according to claim 21, wherein the viewing parameter is a viewing direction.

24. An apparatus according to claim 21, further comprising means for rendering the surface primitives according to the selected rendering order to produce rendered image data.

25. An apparatus according to claim 24, further comprising display means for processing the rendered image data to display a two-dimensional image of the objects.

26. An apparatus according to claim 24, further comprising a frame buffer memory for storing the rendered image data.

27. An interactive graphics apparatus for processing signals defining objects in a three-dimensional space, each object being comprised of a plurality of surface primitives, so as to determine a rendering order in which the surface primitive may be rendered to effect hidden surface removal, comprising:

processing means for processing the signals to determine (i) a first rendering order, effective for the primitives for a first range of values of a viewing parameter, wherein a cycle in which a first primitive and a second primitive which cannot be ordered for the first range is detected and at least one of the first primitive and the second primitive is split into smaller primitives to break the cycle, and (ii) at least one further rendering order, effective for the primitives for a second range of values of the viewing parameter;

viewing parameter definition means for interactively defining an actual value of the viewing parameter, in accordance with which a two-dimensional image of the objects is to be rendered; and selecting means for selecting one of the previously determined rendering orders as a selected rendering order in dependence upon the actual value of the viewing parameter, wherein said processing means processes the signals to determine the first rendering order by breaking a cycle having three or more primitives by splitting a primitive along a boundary between a fragment which can be occluded by another primitive and a complementary fragment which cannot be occluded by said other primitive for the first range of values of the viewing parameter, the primitive being split if the fragment cannot occlude a third primitive which is a further primitive in the cycle.

28. An apparatus according to claim 27, wherein said processing means determines the first rendering order and the further rendering order as a rendering order list, tree or directed graph.

29. An apparatus according to claim 27, wherein the viewing parameter is a viewing direction.

30. An apparatus according to claim 27, further comprising means for rendering the surface primitives according to the selected rendering order to produce rendered image data.

31. An apparatus according to claim 30, further comprising display means for processing the rendered image data to display a two-dimensional image of the objects.

32. An apparatus according to claim 30, further comprising a frame buffer memory for storing the rendered image data.

33. A computer-useable medium storing computer-useable instructions for causing a processor in an interactive graphics apparatus to process signals defining objects comprised of a plurality of surface primitives in a three-dimensional space to determine a rendering order in which the surface primitives may be rendered to effect hidden surface removal, the instructions comprising instructions for:

causing the processor to process the signals to determine a first rendering order, effective for the primitives for a first range of values of a viewing parameter, wherein a cycle in which a first primitive and a second primitive which cannot be ordered for the first range is detected and at least one of the first primitive and the second primitive is split into smaller primitives to break the cycle;

causing the processor to process the signals to determine at least one further rendering order, effective for the primitives for a second range of values of the viewing parameter; and causing the processor to select, in response to the interactive definition of an actual value of the viewing parameter in accordance with which a two-dimensional image of the objects is to be rendered, one of the previously determined rendering orders as a selecting rendering order in dependence upon the actual value of the viewing parameter, wherein the instructions for causing the processor to process the signals to determine the first rendering order include instructions for causing the processor to (i) identify a cycle having exactly two primitives therein, each primitive having extents and lying within a plane, and (ii) break the cycle by splitting whichever primitive of the two is judged to minimize a probability of further cycles remaining, a given one of the primitives being selected for splitting by making reference to the extents of the given primitive with respect to the plane of the other primitive.

34. A computer-useable medium according to claim 33, wherein the instructions for causing the processor to determine the first rendering order and the instructions for causing the processor to determine the further rendering order comprise instructions for causing the processor to determine the first rendering order and the further rendering order as a rendering order list, tree or directed graph.

35. A computer-usable medium according to claim 33, wherein the viewing parameter is a viewing direction.

36. A computer-usable medium according to claim 33, further comprising instructions for causing the processor to render the surface primitives according to the selected rendering ordered to produce rendered image data.

37. A computer-usable medium according to claim 36, further comprising instructions for causing the processor to generate a signal conveying the rendered image data.

38. A computer-usable medium according to claim 37, further comprising instructions for causing the processor to record the signal.

39. A computer-usable medium according to claim 36, further comprising instructions for causing the processor to process the rendered image data in order to generate a display of an image of the objects.

40. A computer-usable medium according to claim 33, further comprising instructions for causing the processor to generate a signal conveying the rendering order and the further rendering order.

41. A computer-usable medium according to claim 40, further comprising instructions for causing the processor to record the signal.

42. A computer-useable medium according to claim 33, further comprising instructions for causing the processor to generate a signal conveying the selected rendering order.

43. A computer-usable medium storing computer-usable instructions for causing a processor in an interactive graphics apparatus to process signals defining objects comprised of a plurality of surface primitives in a three-dimensional space to determine a rendering order in which the surface primitives may be rendered to effect hidden surface removal, the instructions comprising instructions for:

causing the processor to process the signals to determine a first rendering order, effective for the primitives for a first range of values of a viewing parameter, by detecting a cycle comprising a first primitive and a second primitive which cannot be ordered for the first range and splitting at least one of the first primitive and the second primitive into smaller primitives to break the cycle;

causing the processor to process the signals to determine at least one further rendering order, effective for the primitives for a second range of values of the viewing parameter; and causing the processor to select, in response to the interactive definition of an actual value of the viewing parameter in accordance with which a two-dimensional image of the objects is to be rendered, one of the previously determined rendering orders as a selected rendering order in dependence upon the actual value of the viewing parameter, wherein the instructions for causing the processor to process the signals to determine the first rendering order include instructions for causing the processor to (i) identify a cycle having three or more primitives therein, and (ii) break the cycle by splitting a primitive along a boundary between a fragment which can be occluded by another primitive and a complementary fragment which cannot be occluded by said other primitive for the first range of values of the viewing parameter, the primitive being split if the fragment cannot occlude a third primitive which is a further primitive in the cycle.

44. A computer-usable medium according to claim 43, wherein the instructions for causing the processor to determine the first rendering order and the instructions for causing the processor to determine the further rendering order comprise instructions for causing the processor to determine both the first rendering order and the further rendering order as a rendering order list, tree or directed graph.

45. A computer-usable medium according to claim 43, wherein the viewing parameter is a viewing direction.

46. A computer-usable medium according to claim 43, further comprising instructions for causing the processor to render the surface primitives according to the selected rendering order to produce rendered image data.

47. A computer-usable medium according to claim 46, further comprising instructions for causing the processor to generate a signal conveying the rendered image data.

48. A computer-usable medium according to claim 47, further comprising instructions for causing the processor to record the signal.

49. A computer-usable medium according to claim 46, further comprising instructions for causing the processor to process the rendered image data in order to generate a display of an image of the object.

50. A computer-usable medium according to claim 43, further comprising instructions for causing the processor to generate a signal conveying the rendering order and the further rendering order.

51. A computer-usable medium according to claim 50, further comprising instructions for causing the processor to record the signal.

52. A computer-useable medium according to claim 43, further comprising instructions for causing the processor to generate a signal conveying the selected rendering order.

* * * * *

UNITED STATES PATENT AND TRADEMARK OFFICE
CERTIFICATE OF CORRECTION

PATENT NO. : 5,684,936

DATED : November 4, 1997

INVENTOR(S) : Otto

It is certified that error appears in the above-identified patent and that said Letters Patent is hereby corrected as shown below:

Title page;

[30] Foreign Application Priority Data

"9303009" should read --9303009.6--; and

"9313617" should read --9313617.4--.

COLUMN 4

Line 54, "polgon's" should read --polygon's--.

COLUMN 14

Line 66, "favourite" should read --favorite--.

COLUMN 15

Line 1, "favourite" should read --favorite--;

Line 7, "favourite" should read --favorite--;

UNITED STATES PATENT AND TRADEMARK OFFICE
CERTIFICATE OF CORRECTION

PATENT NO. : 5,684,936

DATED : November 4, 1997

INVENTOR(S) : Otto

Page 2 of 3

It is certified that error appears in the above-identified patent and that said Letters Patent is hereby corrected as shown below:

Line 30, "favourite" should read --favorite--; and

Line 32, "favourite" should read --favorite--.

COLUMN 16

Line 1, "viewer when" should read --viewer. When--.

COLUMN 18

Line 1, "favourite" should read --favorite--;

Line 2, "favourite" should read --favorite--; and

Line 57, "favourite" should read --favorite--.

COLUMN 21

Line 61, "'said" should read --said--.

UNITED STATES PATENT AND TRADEMARK OFFICE
CERTIFICATE OF CORRECTION

PATENT NO. : 5,684,936

DATED : November 4, 1997

INVENTOR(S) : Otto

It is certified that error appears in the above-identified patent and that said Letters Patent is hereby corrected as shown below:

COLUMN 23

Line 32, "the" (second occurrence) should read --the polygon--.

COLUMN 27

Line 5, "an" should read --and--.

COLUMN 29

Line 5, "two" should read --two---.

COLUMN 31

Line 19, "primitive" should read --primitives--.

Signed and Sealed this

Twenty-fifth Day of August, 1998

Attest:

BRUCE LEHMAN

Attesting Officer

Commissioner of Patents and Trademarks